United States Patent [19]
Larsson et al.

[11] Patent Number: 6,128,295
[45] Date of Patent: Oct. 3, 2000

[54] BUFFERING OF POINT-TO-POINT AND/OR POINT-TO-MULTIPOINT ATM CELLS

[75] Inventors: Gunnar Larsson, Tumba; Anders Bjenne, Huddinge; Clarence Fransson, Älvsjö; Raimo Sissonen, Huddinge, all of Sweden

[73] Assignee: Telefonaktiebolaget LM Ericsson, Osaka, Japan

[21] Appl. No.: 08/893,677

[22] Filed: Jul. 11, 1997

[51] Int. Cl.[7] .................................................. H04L 12/56
[52] U.S. Cl. ........................... 370/389; 370/395; 370/412; 370/905
[58] Field of Search .................................... 370/412, 413, 370/414, 417–419, 427–429, 432, 395–399, 400, 409, 390, 389; 711/147–153

[56] References Cited

U.S. PATENT DOCUMENTS

| | | | |
|---|---|---|---|
| 5,043,981 | 8/1991 | Firoozmand et al. | 370/235 |
| 5,361,255 | 11/1994 | Diaz et al. | 370/413 |
| 5,440,548 | 8/1995 | Denissen | 370/390 |
| 5,521,916 | 5/1996 | Choudhury et al. | 370/414 |
| 5,528,588 | 6/1996 | Bennett et al. | 370/396 |
| 5,535,202 | 7/1996 | Kondoh | 370/412 |
| 5,537,400 | 7/1996 | Diaz et al. | 370/412 |
| 5,724,358 | 3/1998 | Headrick et al. | 370/418 |
| 5,774,465 | 6/1998 | Lau et al. | 370/397 |
| 5,844,906 | 12/1998 | Kheghatti et al. | 370/474 |

FOREIGN PATENT DOCUMENTS

| | | |
|---|---|---|
| 0 606 729 A2 | 7/1994 | European Pat. Off. . |
| 94480030 | 10/1995 | European Pat. Off. . |
| 0 680 179 A1 | 11/1995 | European Pat. Off. . |
| 0 719 065 A1 | 6/1996 | European Pat. Off. . |
| 0 778 686 A2 | 6/1997 | European Pat. Off. . |
| 0 785 697 A2 | 7/1997 | European Pat. Off. . |
| 2 308 959 | 7/1997 | United Kingdom . |

*Primary Examiner*—Seema S. Rao
*Attorney, Agent, or Firm*—Nixon & Vanderhye, P.C.

[57] ABSTRACT

An Asynchronous Transfer Mode (ATM) switching device (20) has ATM cells (both point-to-point and point-to-multipoint) routed therethrough to one or more physical output links (31–38). The switching device (20) includes a cell buffer memory (92) which is the sole storage area on an egress exchange terminal for all cells, including point-to-multipoint cells, regardless of to which physical output link the cell is destined. For point-to-multipoint cells, pointers to the location of the cell in the cell buffer memory (92) are stored in one or more pointer queues (114), the pointer queues (114) corresponding to physical output links over which the point-to-multipoint cells are expected to be propagated. As each physical output link is selected, the pointer in the corresponding pointer queue is used to obtain the cell from the cell buffer memory (92) for readout on the selected link.

13 Claims, 18 Drawing Sheets

BUFFERING OF POINT-TO-POINT AND/OR POINT-TO-MULTIPOINT ATM CELLS

This application is related to simultaneously filed U.S. patent application Ser. No. 08/893,507, now pending entitled "AUGMENTATION OF ATM CELL WITH BUFFERING DATA", which is incorporated herein by reference.

BACKGROUND

1. Field of Invention

This invention pertains to telecommunications, and particularly to the handling of cells in a switching node of a telecommunications network operating in the asynchronous transfer mode.

2. Related Art and Other Considerations

The increasing interest for high band services such as multimedia applications, video on demand, video telephone, and teleconferencing has motivated development of the Broadband Integrated Service Digital Network (B-ISDN). B-ISDN is based on a technology know as Asynchronous Transfer Mode (ATM), and offers considerable extension of telecommunications capabilities.

ATM is a packet-oriented transfer mode which uses asynchronous time division multiplexing techniques. Packets are called cells and have a fixed size. An ATM cell consists of 53 octets, five of which form a header and forty eight of which constitute a "payload" or information portion of the cell. The header of the ATM cell includes two quantities which are used to identify a connection in an ATM network over which the cell is to travel, particularly the VPI (Virtual Path Identifier) and VCI (Virtual Channel Identifier). In general, the virtual path is a principal path defined between two switching nodes of the network; the virtual channel is one specific connection on the respective principal path.

At its termination points, an ATM network is connected to terminal equipment, e.g., ATM network users. Between ATM network termination points are a plurality of switching nodes having ports which are connected together by physical transmission paths or links. In traveling from an origin terminal equipment to a destination terminal equipment, ATM cells forming a message may travel through several switching nodes.

A switching node has a plurality of ports, each of which is connected by via a line termination circuit and a link to another node. The line termination circuit performs packaging of the cells according to the particular protocol in use on the link. A cell incoming to a switching node may enter the switching node at a first port and exit from a second port via a line termination circuit onto a link connected to another node. Each link can carry cells for a plurality of connections, a connection being a transmission between a calling subscriber or party and a called subscriber or party.

Many cells which are transmitted through an ATM network travel from an origination node to a single destination or target node, and accordingly are known as point-to-point cells. Some switching nodes are capable of handling cells, known as point-to-multipoint cells, which travel from an origination node to a plurality of destination nodes. Some of the point-to-multipoint cells, although being for differing connections, may travel on the same link.

The switching nodes each typically have several functional parts, a primary of which is a switch core. The switch core essentially functions like a cross-connect between ports of the switch. Paths internal to the switch core are selectively controlled so that particular ports of the switch are connected together to allow a message ultimately to travel from the originating terminal equipment to the destination terminal equipment.

In a conventional switching technique, queues or buffers are provided for each port for e.g., storing cells prior to readout. In situations in which cells may have one of a plurality of priority classes, each port may have a number of queues or buffers corresponding to the number of priority classes. Cells are fed into an appropriate buffer by an input queue selector, and are readout of the buffer at an appropriate time by an output queue selector. In contrast to point-to-point cells, a common queue or buffer is provided (e.g., one queue for each priority class) for point-to-multipoint cells. When a point-to-multipoint cell is to be readout, the common queue for the point-to-multipoint cells is selected. How often the common queue for the point-to-multipoint cells is selected for a given cell payload depends on the number of point-to-multipoint leaves for which the cell is to be utilized. Thus, in essence, the cell is copied from the common queue in accordance with the number of nodes or multipoint leaves to which it is to be transmitted. A point-to-multipoint cell belongs to one connection; the cell is copied to all leaves.

At times a particular one of the line termination circuits (through which the switch port is connected to a corresponding outgoing link) can indicate that it is temporarily busy or saturated. In such cases, that particular line termination circuit may generate a signal indicating that no more data should be sent to its link. Such a busy signal is particularly prone to occur when the cell in the common queue for point-to-multipoint cells is repeatedly replicated to one link. When such a busy signal occurs, other cells cannot be readout of the common queue for point-to-multipoint cells and cannot be forwarded to other links. Thus, the particular link which stopped readout from the common queue for point-to-multipoint cells effectively blocks the common queue, and sets up what has been termed a 'head of queue blocking problem'. The head of queue blocking problem undesirably increases the delay for point-to-multipoint cell copies destined for other links. This problem may also result in discarding of point-to-multipoint cells in the queue. In some implementations, the problems can be propogated to ingress point-to-multipoint queues, and discarding may be necessary. Even point-to-point queues may in some implementations be affected. These problems may result in degredation of throughput.

Another problem with a common point-to-multipoint queue is that it causes long delays between readout of first cell and last cells in a large point-to-multipoint tree (e.g., many leaves).

An alternative to the foregoing technique is the copying of point-to-multipoint cells to all leaves before storing the cells in the different link queues. However, such copying requires cessation of cell input until all copies have been made, which may decrease throughput and increase delay. Such copying could conceivably be accomplished in background (e.g., while waiting to fill empty cell slots), but since the copying may take a long time the delay and delay variation for point-to-multipoint cells will be very poor.

What is needed therefore, and an object of the present invention, is a technique for efficiently handling point-to-multipoint ATM cells in a switching node.

SUMMARY

An Asynchronous Transfer Mode (ATM) switching device has ATM cells (both point-to-point and point-tomultipoint) routed therethrough to one or more physical output links. The switching device includes a cell buffer memory which is the sole storage area for all cells on the egress exchange terminal, including point-to-multipoint cells, regardless of to which physical output link the cell is destined. For point-to-multipoint cells, pointers to the location of the cell in the cell memory are stored in one or more pointer queues, the pointer queues corresponding to physical output links over which the point-to-multipoint cells are expected to be propagated. As each physical output link is selected, the pointer in the corresponding pointer queue is used to obtain the cell from the cell buffer memory for readout on the selected link.

A connection data record memory has stored therein at least two connection data records for each point-to-multipoint cell. The first connection data record has stored therein a next leaf pointer for each of the physical output links which are active for the cell as well as an indicator of which physical output links are active for the cell. The second connection data record, for an active one of the physical output links, is pointed to by the next leaf pointer of the first connection data record for the respective physical output link. The second connection data record has at least one of a virtual path identifier (VPI) and a virtual circuit identifier (VCI) stored therein for inclusion in the output-destined ATM cell. The second connection data record also stores a last leaf flag which indicates whether there is a further connection data record for the respective physical output link. The second connection data record further has a further next leaf pointer in the case that the last leaf flag of the second connection data record indicates there is a further connection data record. The further next leaf pointer points to the further connection data record. Thus, a linked list of connection data records is established so that copies of the point-to-multipoint cell can be sent over the same physical output link.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
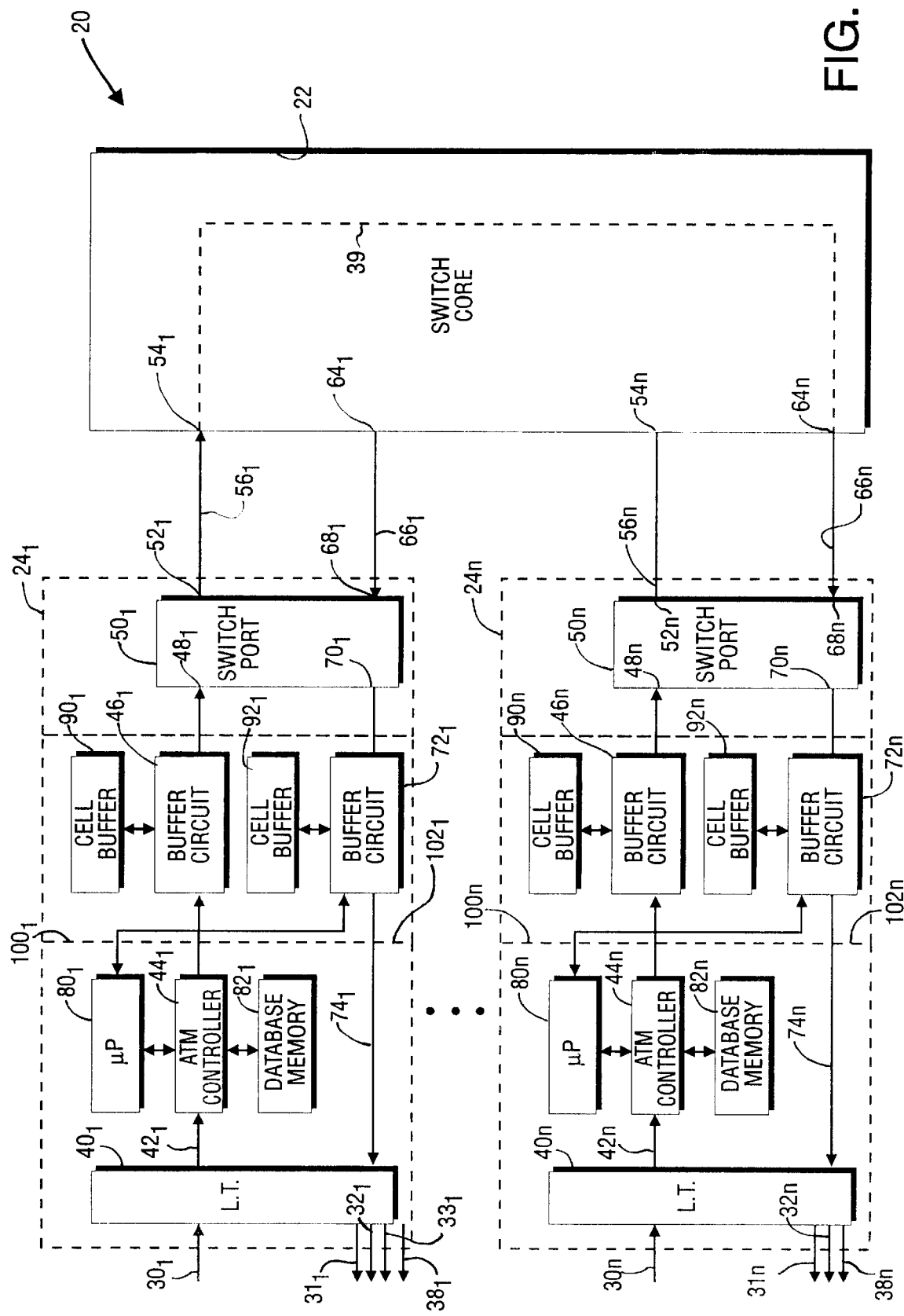
FIG. 1 is a schematic view of an ATM switch according to an embodiment of the invention.

FIG. 1 shows an ATM switch 20 which primarily includes a switch core 22 and a plurality of device boards or exchange terminals $24_1-24_n$. Each exchange terminal is connected to other portions of an ATM network, e.g., other nodes, by a set of ingress physical links 30 and a set of egress physical links 31–38. For example, exchange terminal $24_1$ is shown with ingress physical links $30_1$ and egress physical links $31_1-38_1$.

Although only two exchange terminals 24 are shown in FIG. 1, it should be understood that many other such exchange terminals are provided and are connected to switch core 22 in the same manner shown with respect to the illustrated exchange terminals. Moreover, unsubscripted reference to an exchange terminal or a constituent element of an exchange terminal is intended to refer to any such exchange terminal or element generically, and not to one specific exchange terminal or element. The egress physical links, such as links $31_1-38_1$, are also generically referred to as links phy0–phy7, respectively, which generic representations are also abbreviated as ph0–ph7, respectively.

A primary function of switch core 22 is to perform space switching, e.g., to route ATM cells received at one input terminal thereof to an appropriate output terminal(s) of switch core 22, so that an ATM transmission (potentially comprising many ATM cells) can occur between origination terminal equipment (the sender) and destination terminal equipment (the intended receiver). For example, as illustrated by broken line 39, FIG. 1 shows switch core 22 connecting two ports so that cells on link $30_1$ incoming to switch 20 are ultimately transmitted to one or more of egress links $31_n-38_n$. Switch core 22 also performs copying of ATM cells and distribution of ATM cells to appropriate output terminals thereof in the case of point-to-multipoint cells, also known as multicast cells. The structure and operation of switch core 22 is understood by the person skilled in the art and accordingly is not detailed further herein.

Exchange terminals 24 of switch 20 each include line termination equipment (L.T.) 40 for interfacing with ingress physical links 30 and egress physical links 31–38. On their incoming side, each exchange terminal 24 has links 42 which connect line termination equipment 40 with an ATM controller 44. In the illustrated embodiment, as many as thirty two physical links 30 can be connected to ATM controller 44. An output terminal of controller 44 is connected to first buffer circuit 46, which in turn is connected to a switch port ingress input terminal 48 of switch port 50. Switch port 50 has an ingress output terminal 52 which is connected to a suitable one of a plurality of switch core ingress input terminals 54 by a switch core ingress input interface 56.

Switch core 22 has a plurality of egress output terminals 64 which are paired with its ingress input terminals 54 and which are connected by switch core egress output interface 66 to exchange terminals 24 in accordance with the corresponding pairing. On their outgoing side, each exchange terminal 24 has egress input terminal 68, the egress input terminal 68 being connected to interface 66. Output terminals 70 on the egress side of switch ports 50 are connected to second buffer circuit 72, which in turn is connected to line termination equipment 40 by link 74. Line termination 40 serves to interface link 74 with egress physical links 31–38.

In each exchange terminal 24, ATM controller 44 is connected both to microprocessor 80 and to database memory 82. Database memory is preferably a random access memory (RAM). Microprocessor 80 is employed, e.g., to construct a database which resides in database memory 82. The database is employed e.g., to augment a cell with connection data. In the illustrated embodiment, ATM controller 44 is a device marketed by PMC-Sierra, Inc. as part number PM7322 RCMP-800 for performing ATM layer routing control, monitoring, and policing. Microprocessor 80 is also connected to buffering circuit 72. Microprocessor 80 writes the connection data, i.e., CDR records.

In the illustrated embodiment, each exchange terminal 24 has a microprocessor 80. Switch 20 has one or more unillustrated central processors to which the plurality of microprocessors 80 of the various exchange terminals 24 are connected.

An output terminal of controller 44 is connected to first buffer circuit 46. First buffer circuit 46 is connected to store and access ATM cells in cell buffer 90. Similarly, second buffer circuit 72 on the outgoing side of exchange terminal 24 is connected to store and access ATM cells in cell buffer 92. It is primarily the processing of cells on the egress side of switch 20, including operation of second buffer circuit 72, which is pertinent to the present invention.

Figure 2:
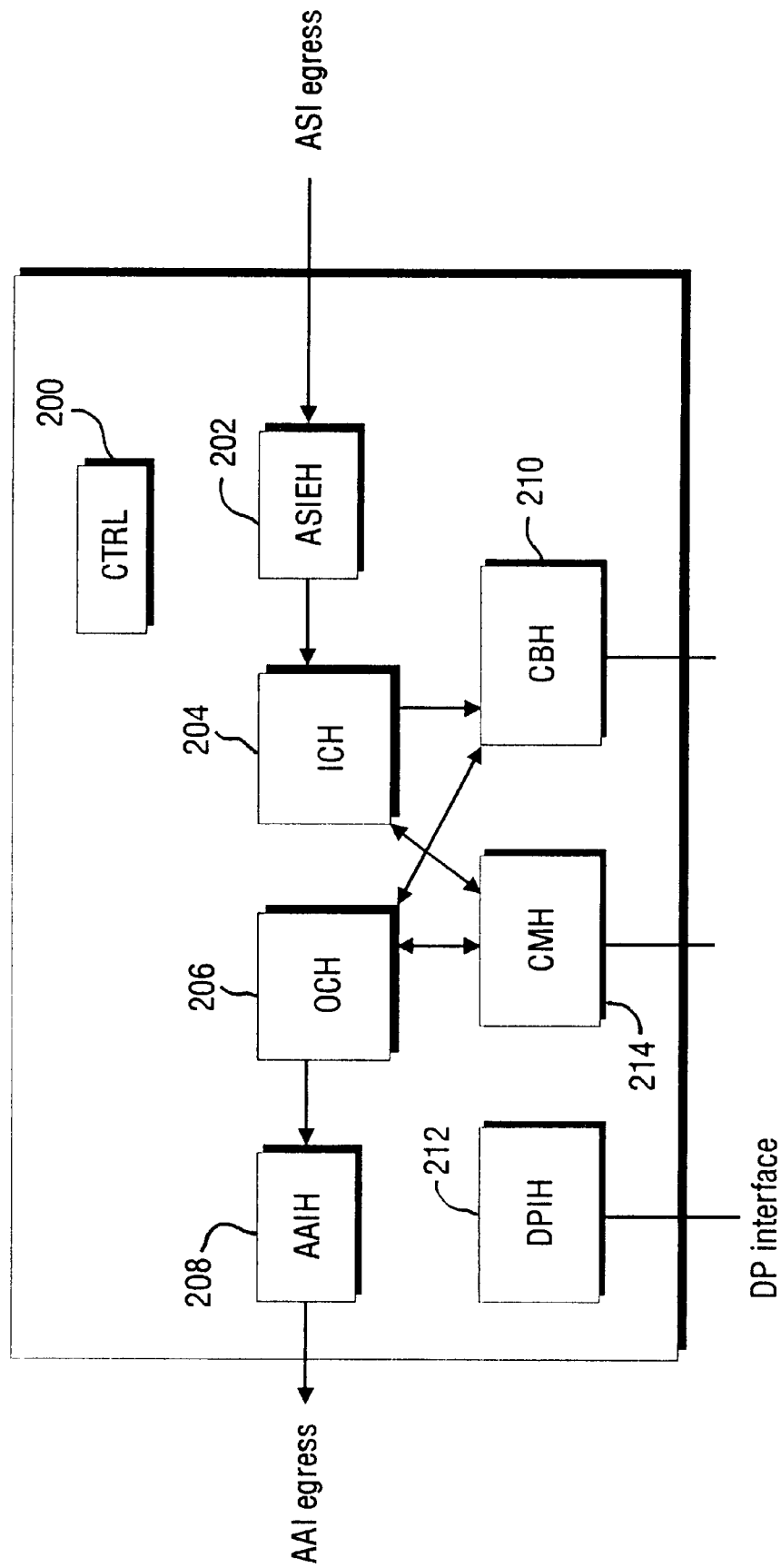
FIG. 2 is a schematic view of a buffer circuit included in the ATM switch of FIG. 1.

One example embodiment of second buffer circuit 72 is shown in FIG. 2. Second buffer circuit 72 has a buffer circuit controller 200 and a plurality of handlers. Buffer circuit controller 200 provides timing information to the various handlers shown in FIG. 2 according to timing information received on an ASI interface.

The handlers include ASIEH interface handler 202; input cell handler (ICH) 204; output cell handler (OCH) 206; ATM transmission convergence/ALM interface handler (AAIH) 208; cell buffer handler (CBH) 210; data processing interface handler (DPIH) 212; and, control memory handler (CMH) 214.

Two of the handlers in the example second buffer circuit 72 are memory handlers. Cell buffer handler (CBH) 210 handles the physical buffering of cells. In particular, cell buffer handler (CBH) 210 contains a DRAM controller for accessing cell buffer 92. Control memory handler (CMH) 214 handles the logical buffering of cells, which means that it stores the cell pointer reads and updates the connection data records (CDRs). Control memory handler (CMH) 214 also handles the free list pointers. Control memory handler (CMH) 214 includes a DRAM controller.

ASIEH interface handler 202 receives the cell from switch core 22. Input cell handler (ICH) 204 receives the cell from handler 202 and obtains the connection data record (CDR) from the memory managed by control memory handler (CMH) 214. Input cell handler (ICH) 204 further performs packet and cell discard and, if the cell is not discarded, asks control memory handler (CMH) 214 for a free cell buffer and to store the queue pointer(s). Input cell handler (ICH) 204 also requests the cell buffer handler (CBH) 210 to store the cell in cell buffer 92.

Output cell handler (OCH) 206 includes a scheduler which selects the cell to be transmitted to the line termination circuit. Output cell handler (OCH) 206 performs address translation from the internal channel number to the outgoing VP/VC value (VPI/VCI from the CDR record). For charging purposes all outgoing cells are counted per VP/VC. Output cell handler (OCH) 206 supports EFCI marking of outgoing cells. Output cell handler (OCH) 206 performs the steps of FIG. 6 in conjunction with ATM transmission convergence/ALM interface handler (AAIH) 208, cell buffer handler (CBH) 210, and control memory handler (CMH) 214.

Figure 3:
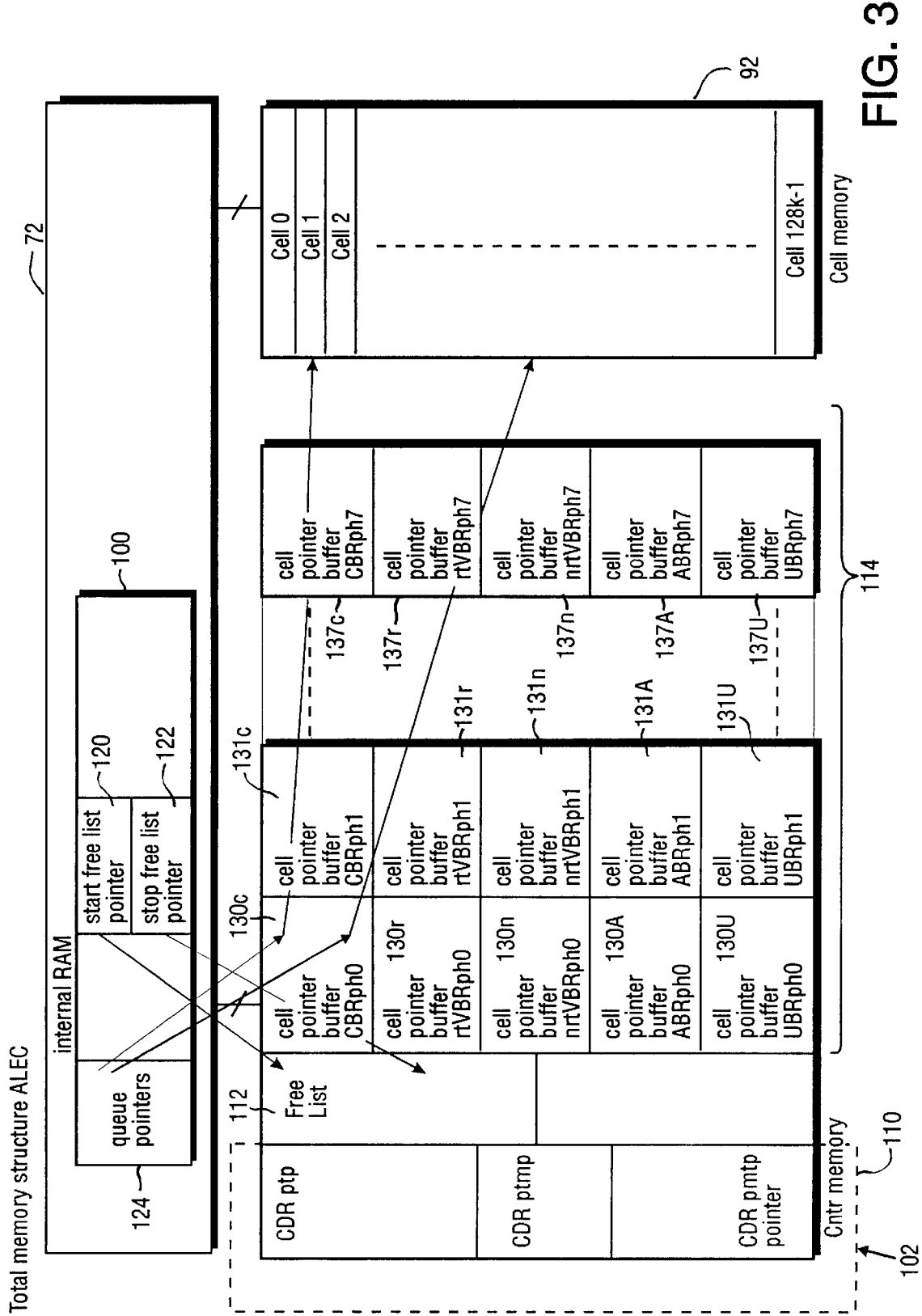
FIG. 3 is a schematic view of a memory structure of a buffer circuit according to an embodiment of the invention.
Figure 4:
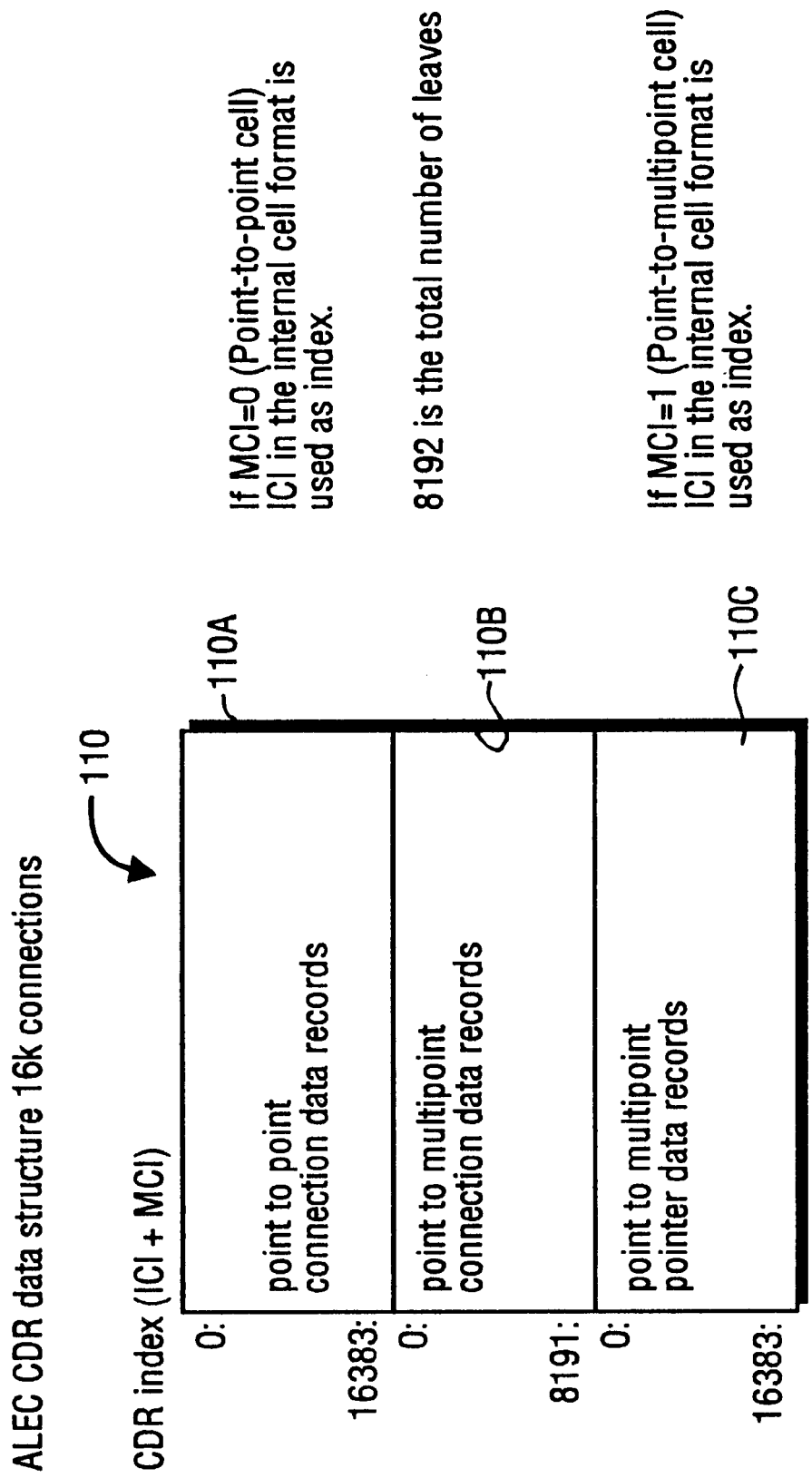
FIG. 4 is a schematic view of a connection data record (CDR) data structure.

FIG. 3 shows cell buffer 92 as well as memory structure of buffer circuit 72. Buffer circuit 72 includes an internal RAM 100. Buffer circuit 72 also accesses a RAM 102, also known as the Cntr RAM. Cell buffer 92 has locations for 128K cells, such locations being labeled as "cell 0", "cell 1", . . . "cell 128k-1" in FIG. 2. Cntr RAM 102 includes a connection data record (CDR) data structure 110 (shown in more detail in FIG. 4); a free list 112; and a queue area 114 wherein are stored queues for each of eight physical links ph0 to ph7. Each column in queue area 114 corresponds to a physical link, for example the first column corresponding to physical link ph0 and the last column corresponding to physical link ph7. Each row of queue area 114 corresponds to a delay priority. In particular, the first row is for CBR; the second row is for rtVBR; the third row is for nrtVBR; the fourth row is for ABR; the fifth row is for UBR.

The foregoing notations are understood with reference to the following: "CBRph0" means Constant Bit Rate for phy 0 (link 0); "nVBRph0" means real-time Variable Bit Rate for phy 0 (link 0); "nrtVBRph0" means non real-time Variable Bit Rate for phy 0 (link 0); "ABR" means Available Bit Rate for phy 0 (link 0); "UBR" means Unspecified Bit Rate for phy 0 (link 0). In a simple implementation, the scheduler takes a cell from the queue with highest priority. CRB has the highest priority, followed by VBR, and so forth in the order discussed above. ABR and UBR, however, do not have any strict difference in priority and must take cells from both queues.

Internal RAM 100 has two pointers utilized for accessing free list 112. The two pointers are a start free list pointer 120 and a stop free list pointer 122. In addition, internal RAM 100 has a set 124 of queue pointers which are illustrated in more detail in FIG. 13.

Figure 5:
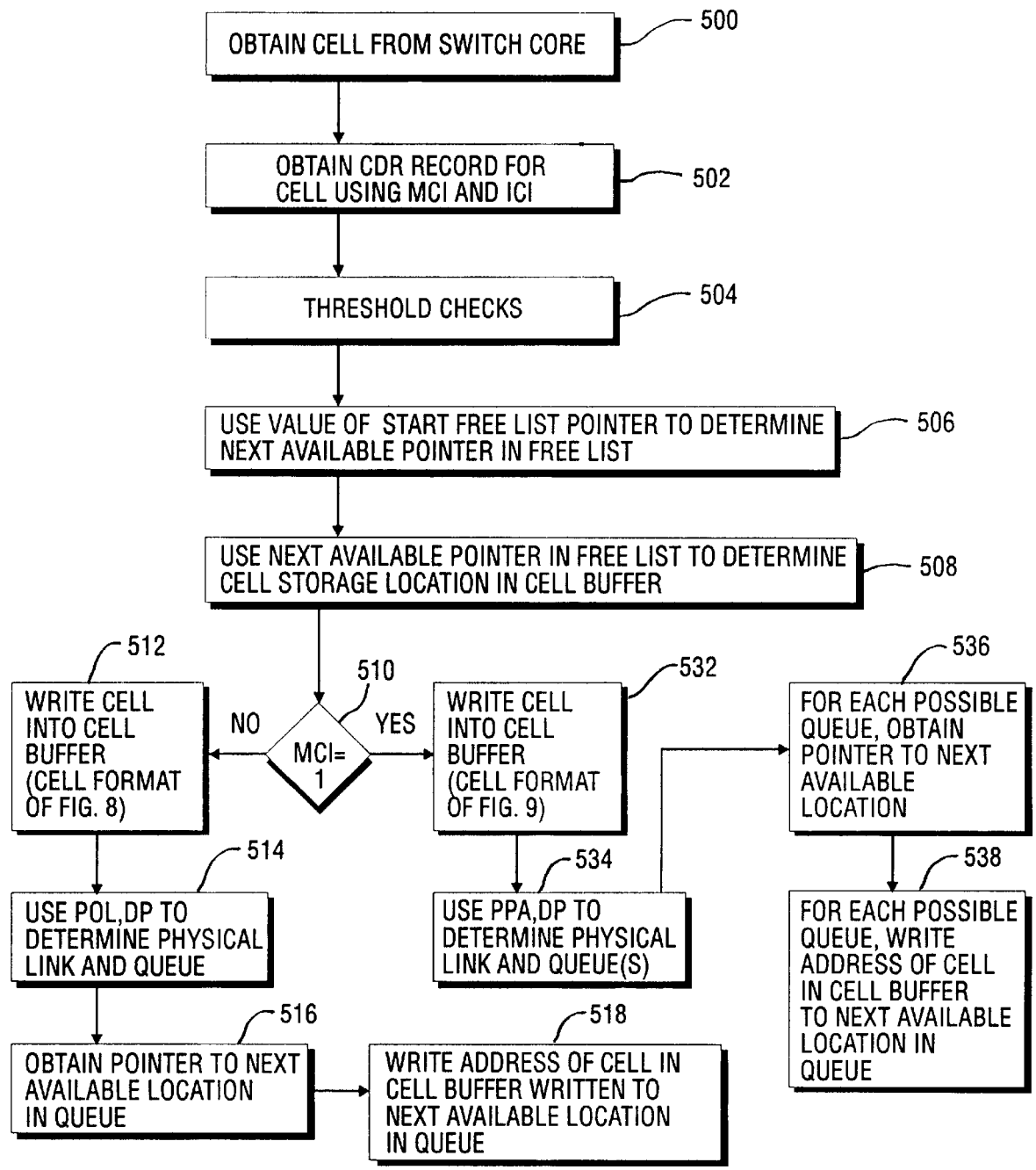
FIG. 5 is a flowchart showing basic steps involved in processing a cell obtained from a switch core and stored in a cell buffer memory.

FIG. 5 shows steps conducted by buffer circuit 72 in obtaining a cell from switch core 22 and storing the cell in cell buffer 92. The cell is acquired through switch port 50, and is particularly obtained from an output terminal 70 on the egress side of switch port 50. Step 500 of FIG. 5 shows acquisition of the cell from switch core 22.

Figure 7:
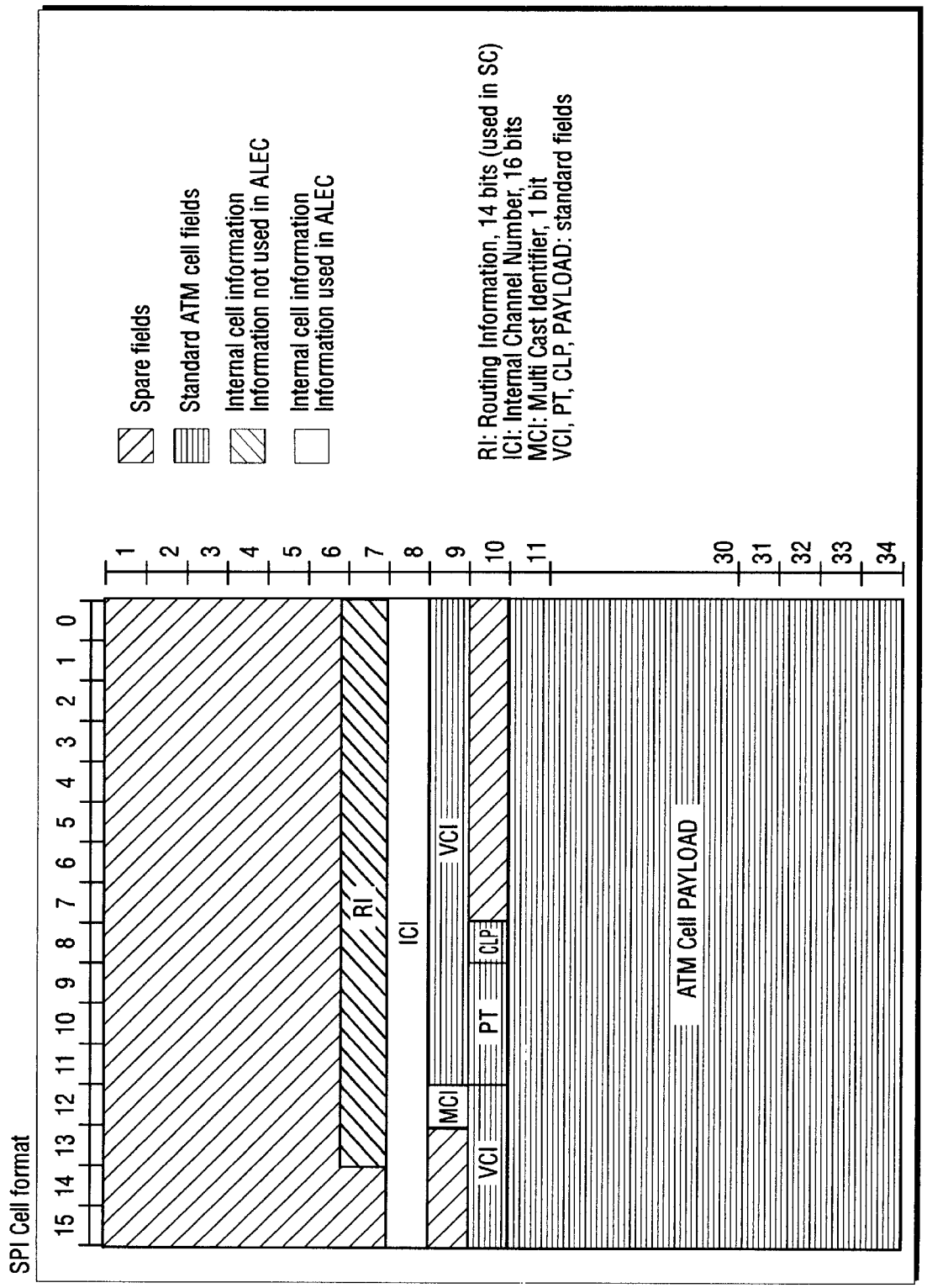
FIG. 7 is a diagrammatic view of a cell obtained from a switch core of the ATM switch of FIG. 1.

The format of a cell obtained from switch core 22 is shown in FIG. 7. The cell obtained from switch core 22 includes a cell payload and various other fields. The other fields having information as obtained from switch core 22 include a routing information field RI (fourteen bits which were employed for routing purposes in switch core 22); an internal channel number (ICI) field (sixteen bits); a multicast identifier (MCI) field (one bit); and the VCI, PT, and CLP fields. The value of the MCI field indicates whether the cell is a point-to-point cell or a point-to-multipoint cell. In the present example, if MCI=0 the cell is a point-to-point cell; if MCI=1 the cell is a point-to-multipoint cell. The value of the ICI field is an internal channel number and, as explained below, is used as an index.

At step 502 buffer circuit 72 obtains a connection data record (CDR) for the cell acquired at step 500. The CDR is obtained from CDR data structure 102, seen generally in FIG. 3 and in more detail in FIG. 4. CDR data structure 102 is effectively partitioned into three regions, particularly a first region 110A for point-to-point connection data records; a second region 110B for point-to-multipoint connection data records; and a third region 110C for point-to-multipoint pointer data records. Whether a cell is a point-to-point cell or a point-to-multipoint cell depends on the MCI, as explained above. If MCI=0 the cell is a point-to-point cell; if MCI=1 the cell is a point-to-multipoint cell. If the cell is a point-to-point cell, the CDR for the cell resides in point-to-point region 100A. If the cell is a point-to-multipoint cell, the CDR for the cell resides in point-to-point region 110C. The value of the field ICI of the cell is used to located the particular record in the region which is applicable to the cell acquired at step 500.

Figure 10:
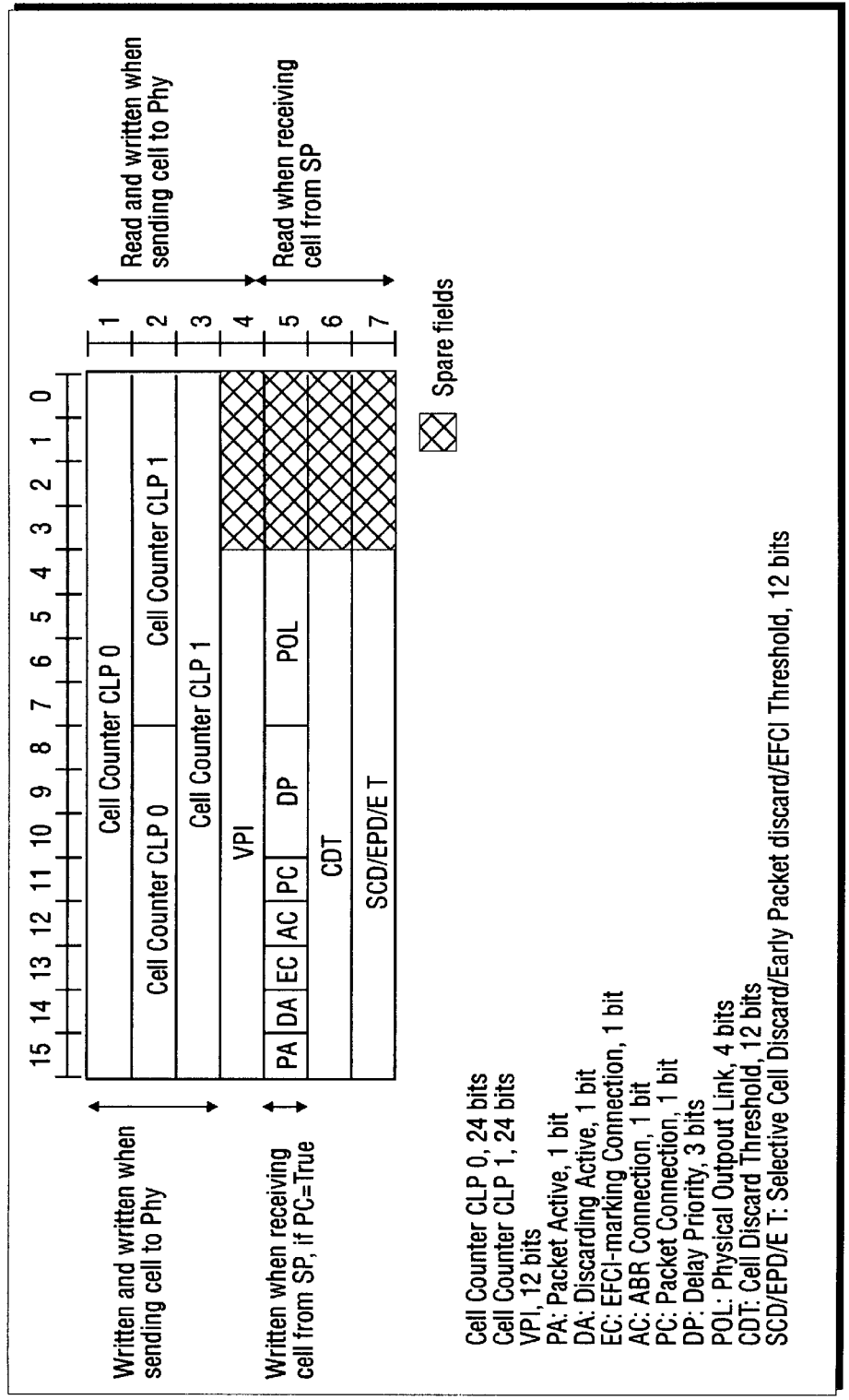
FIG. 10 is a diagrammatic view of a point-to-point connection data record.

The format of a CDR record for a point-to-point cell, i.e., a point-to-point connection data record, is shown in FIG. 10. The CDR record for a point-to-point cell has two twenty-four bit cell counters, particularly Cell Counter CLP 0 and Cell Counter CLP 1. These cell counters are read and written when sending a cell to an appropriate one of the physical links phy0–phy7 (i.e., links 31–38 in FIG. 1). In addition, the CDR record for a point-to-point cell has a twelve bit virtual path identifier (VPI) field and the following fields: PA, DA, EC, AC, PC, DP, POL, CDT, and SCD/EMD/ET. The size and names of these fields are provided in TABLE 1.

TABLE 1

| Field Abbreviation | Field Name | Field Size (bits) |
|---|---|---|
| PA | Packet Connection | 1 |
| DA | Discard Active | 1 |
| EC | EFCI-marking connection | 1 |
| AC | ABR connection | 1 |
| PC | Packet connection | 1 |
| DP | Delay priority | 3 |
| POL | Physical Output Link | 4 |
| CDT | Cell Discard Threshold | 12 |
| SCD/EPD/E T | Selective Cell Discard/Early Packet discard/EFCI Threshold | 12 |

When the connection is established, processor 80 writes the PA, DA, EC, AC, PC, DP, and POL fields into the point-to-point connection data record. These fields, as well as VPI, CDT, and SCD/EPD/E T (when the cell is received from switch core 22, also written when the connection is established), are all read when receiving the cell from switch core 22.

Figure 12:
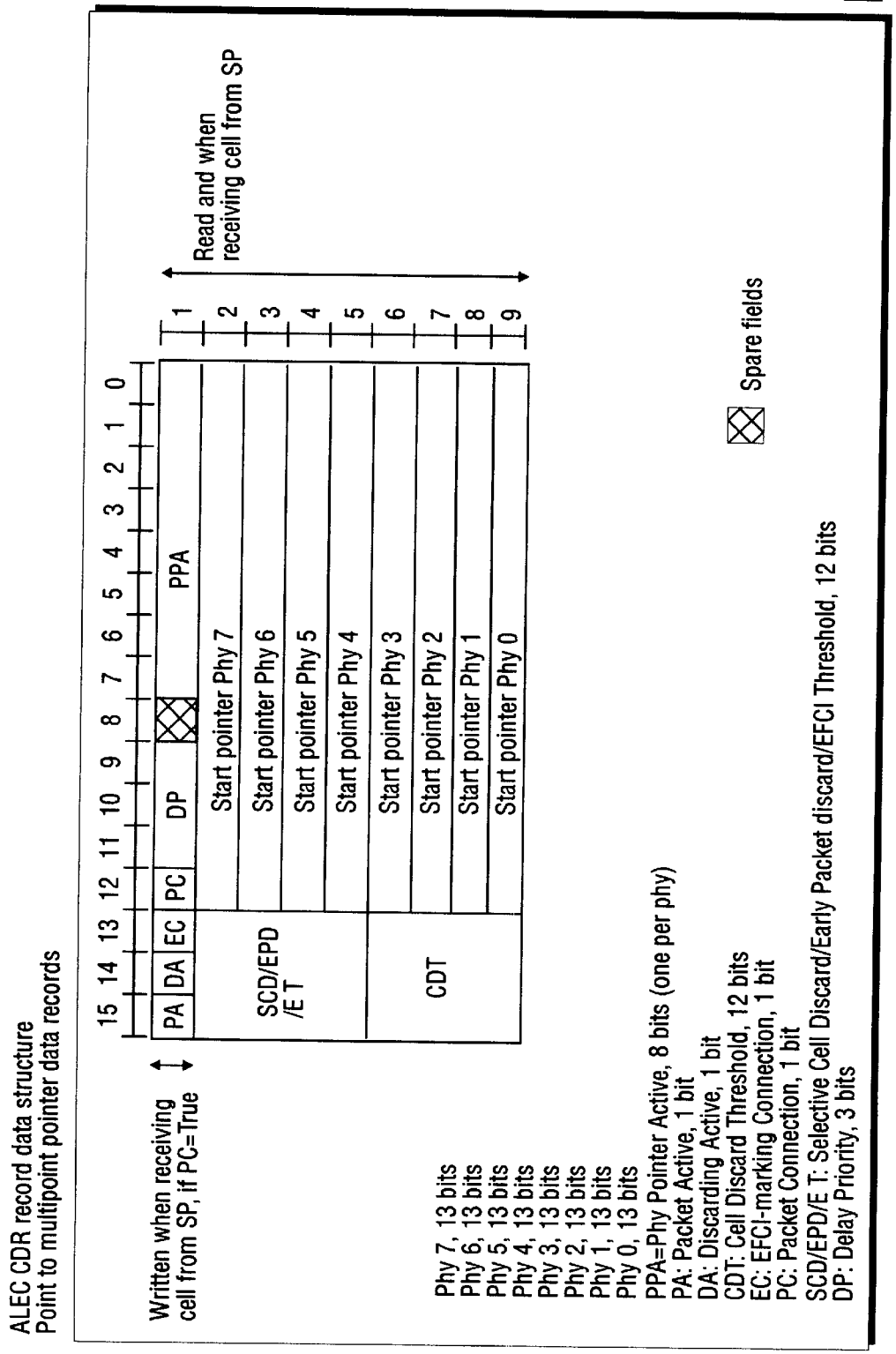
FIG. 12 is a diagrammatic view of a point-to-multipoint pointer connection data record.

The format of a CDR record for a point-to-multipoint cell, i.e., a point-to-multipoint pointer connection data record, is shown in FIG. 12. The point-to-multipoint pointer connection data record has some of the same type of fields as does the point-to-point connection data record, although the fields are in different locations within the record. In addition, the point-to-multipoint connection data record has eight "start pointer" fields, shown in FIG. 12 as "Start pointer Phy0" through "Start pointer Phy7", which correspond to each of the eight physical output links phy0 through phy7. Further, the point-to-multipoint connection data record has an eight bit physical link pointer active field (PPA). The "start pointer" fields and PPA are written into the CDR when the cell is received from switch core 22.

Figure 11:
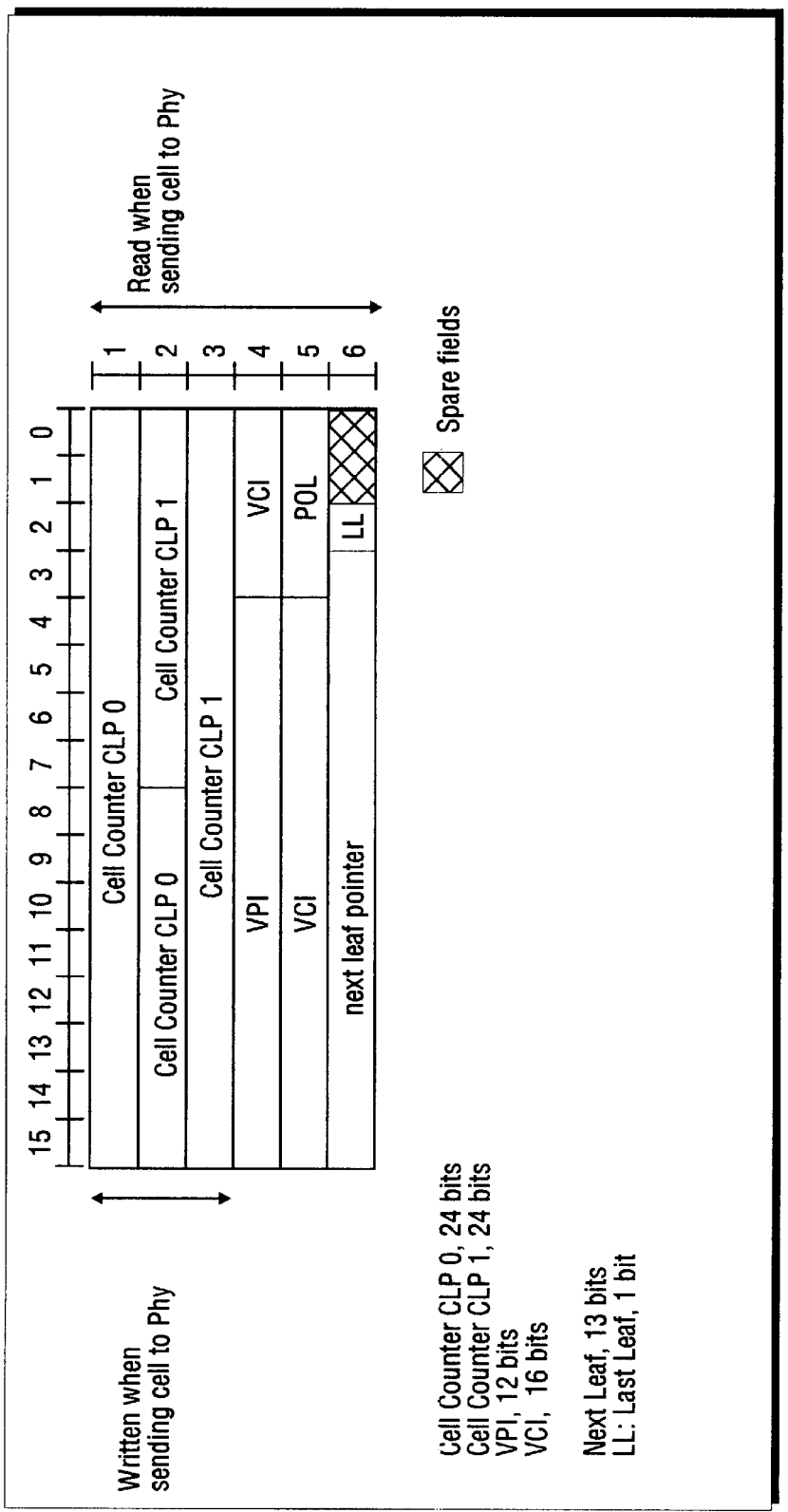
FIG. 11 is a diagrammatic view of a point-to-multipoint connection data record.

The format of point-to-multipoint connection data record is shown in FIG. 11. In addition to having the Cell Counter CLP 0 and Cell Counter CLP 1, the point-to-multipoint connection data record has the VPI and VCI fields, the significance of which is understood from the foregoing. Further the point-to-multipoint connection data record has a thirteen bit next leaf pointer (NLP) field and a one bit last leaf (LL) field. As will be understood subsequently, if the last leaf (LL) field does not indicate that the leaf is the last leaf, the next leaf pointer (NLP) field stores the address of a point-to-multipoint connection data record in region 110C.

After obtaining the CDR record for the cell, at step 504 numerous threshold checks are performed. These threshold checks include evaluations and comparison to thresholds, such as buffer length evaluations, potentially leading to such operations as cell or packet discard and EFCI marking. These evaluations are not necessary for an understanding of the present invention, and accordingly are not discussed in detail herein.

Figure 14:
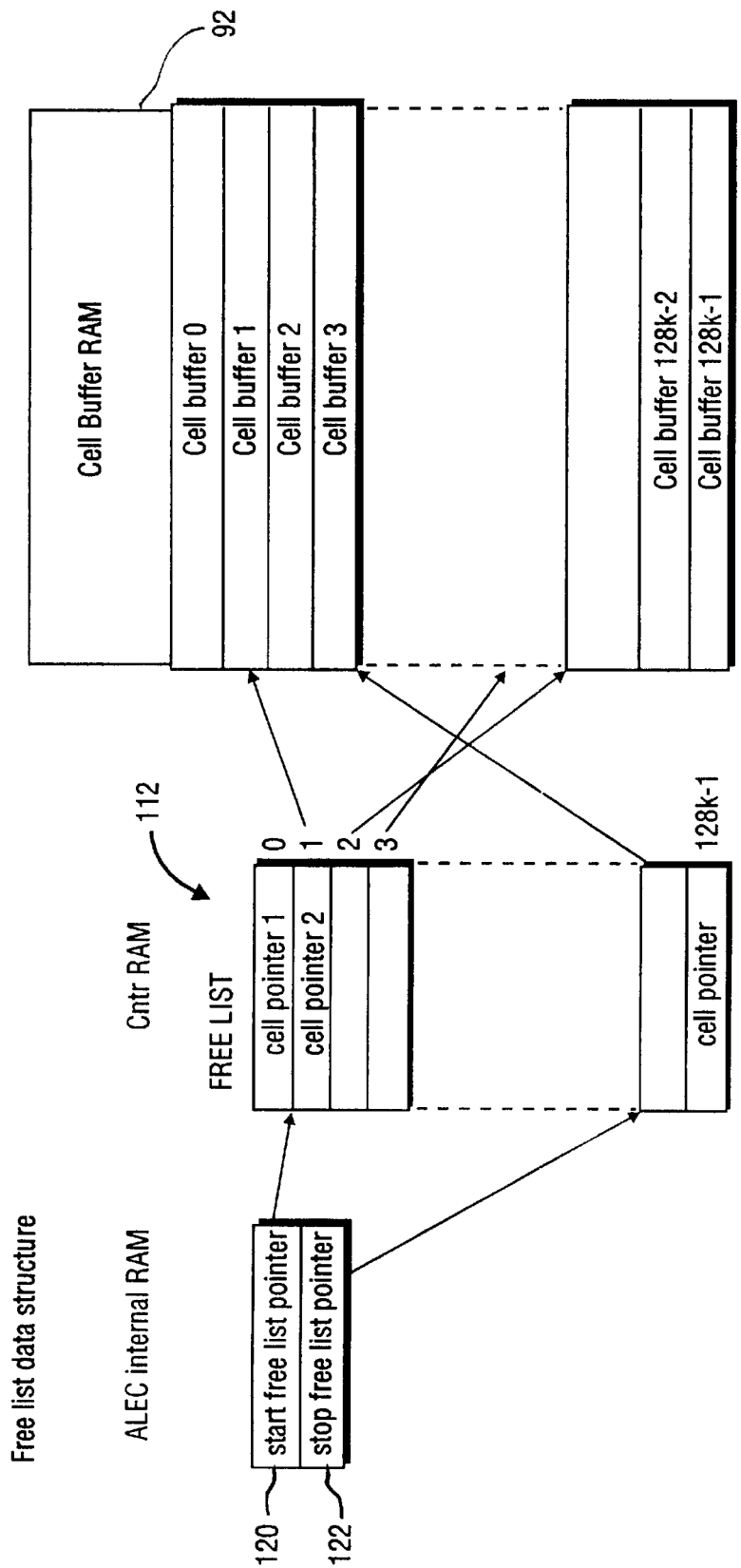
FIG. 14 is a diagrammatic view showing a relationship of free list pointers, a free list of cell pointers, and a cell buffer.
Figure 15:
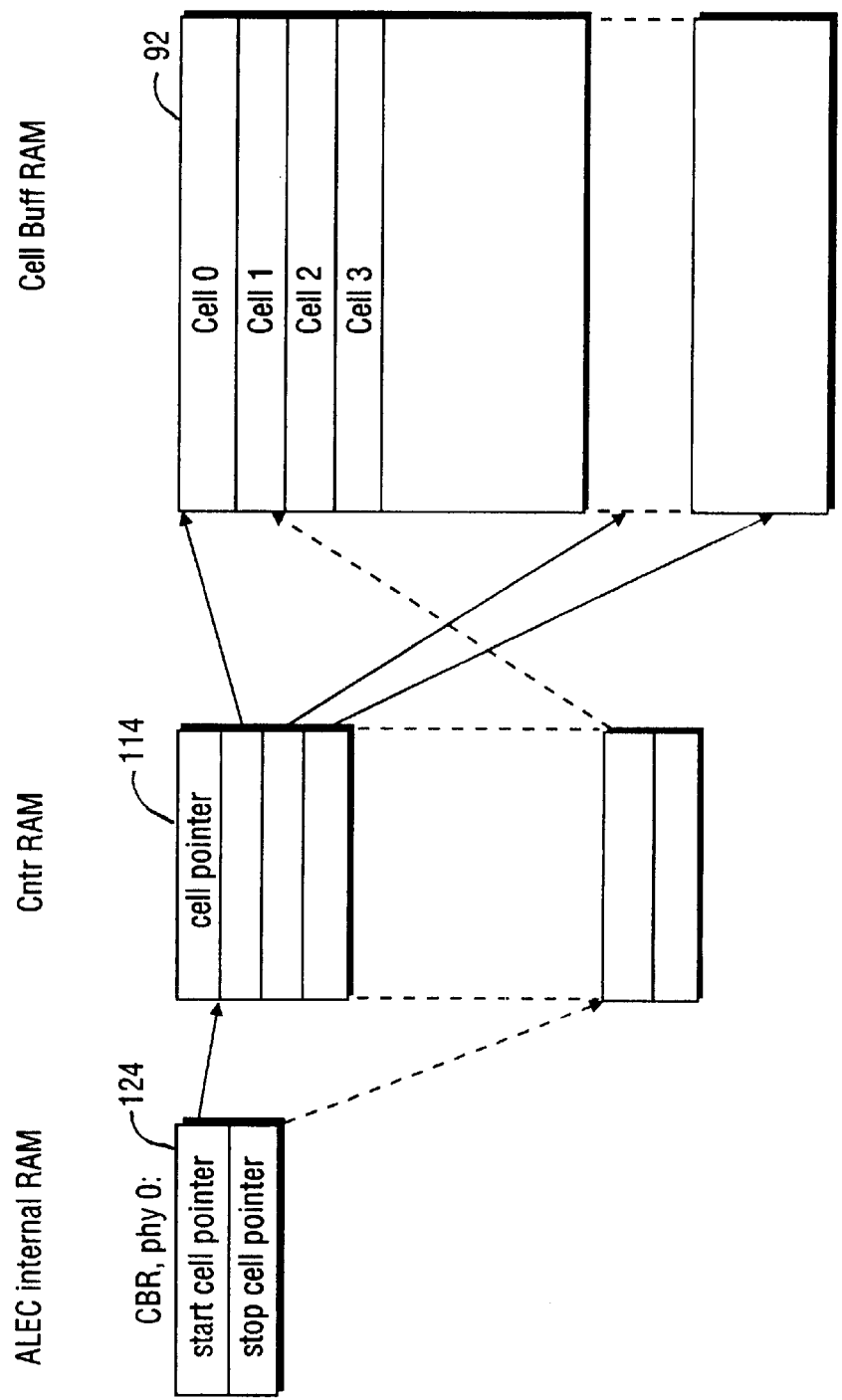
FIG. 15 is a diagrammatic view showing a relationship of start and stop cell queue pointers, a queue, and a cell buffer.

With the cell having been obtained at step 500, and its CDR obtained at step 502, it is next necessary to store the cell in cell buffer 92. Determination of the address in cell buffer 92 in which to store the cell involves steps 506 and 508. At step 506, the value of start free list pointer 120 (see FIG. 3) is utilized to determine which pointer in free list 112 is next available to be utilized. For example, as shown in FIG. 14, start free list pointer 120 has a value which points to address 1, i.e., cell pointer 2, in free list 112. Cell pointer 2 of free list 112 in turn points to a specific address in cell buffer 92, particularly shown as "cell buffer 1" in FIG. 14. Thus, as indicated by step 508, the next available pointer in free list 112 is used to determine the storage location of the cell in cell buffer 92. The start free list pointer is then incremented.

Free list 112 is maintained in such a fashion that when an address in cell buffer 92 becomes free, i.e., a cell is extracted therefrom, such free address is loaded into a location determined by stop free list pointer 122, and the stop free list pointer 122 then is incremented.

Step 510 involves checking whether the value of MCI, obtained from the cell is one. If the value of MCI is not one, the cell is a point-to-point cell and step 512 is next executed. Otherwise, the cell is a point-to-multipoint cell and step 532 is next executed.

Figure 8:
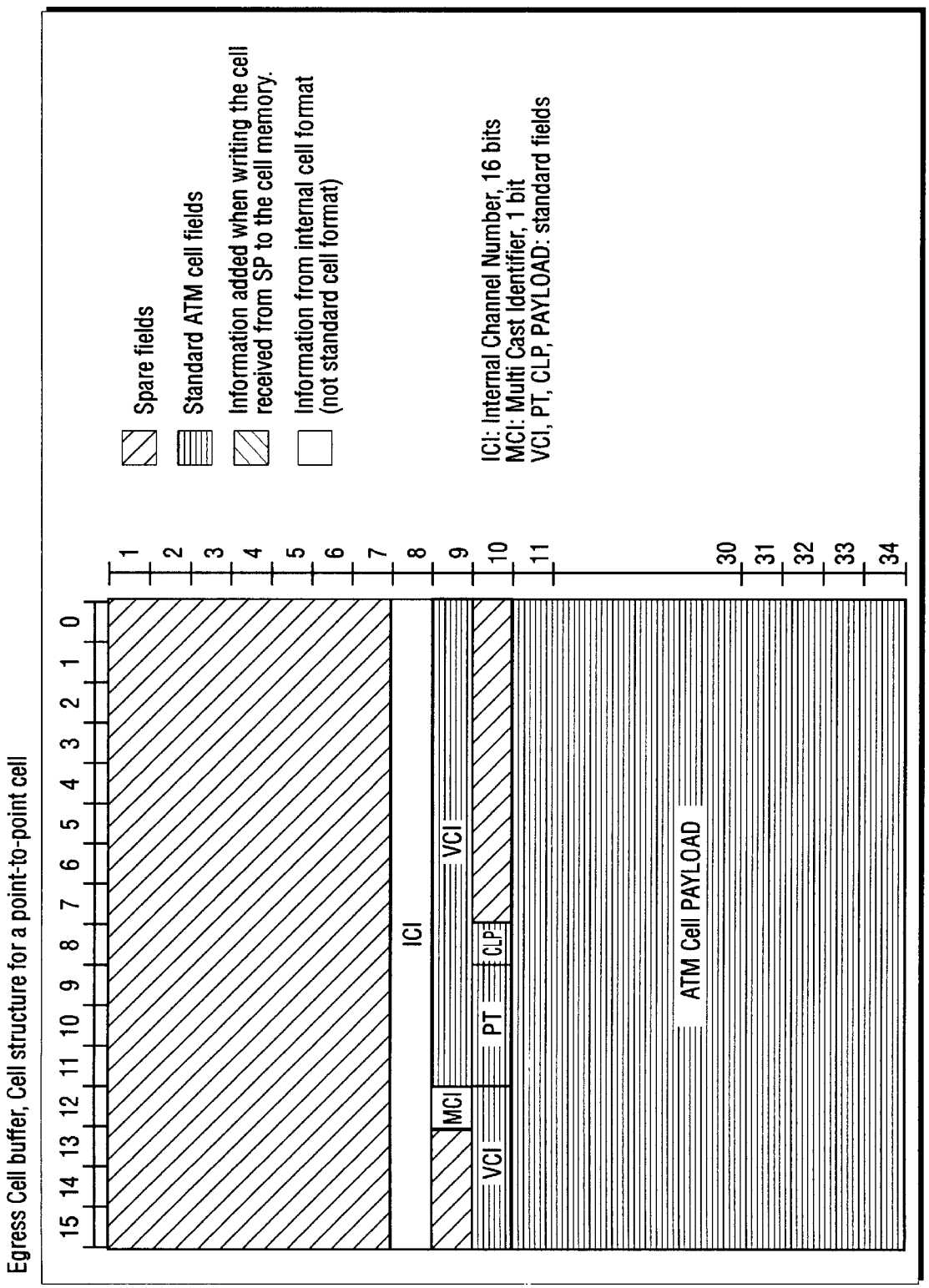
FIG. 8 is a diagrammatic view of a point-to-point cell stored in a cell buffer memory of the ATM switch of FIG. 1.

Step 512 involves writing the cell to the storage location in cell buffer 92 which was determined at step 508 (e.g., cell buffer 1 in the foregoing example). As written into cell buffer 92, the point-to-point cell has the structure shown in FIG. 8.

In cell buffer 92 the cell has the standard ATM cell fields, and in addition the ICI and MCI fields which are obtained in the internal cell format from switch core 22 (see FIG. 7).

At step 514, the values in fields POL and DP, having been obtained from the CDR (see FIG. 10), are utilized to determine to which physical link 31–38 the cell will be outputted, and accordingly which of the corresponding queues in queue area 114 (see FIG. 3) will be utilized.

Figure 13:
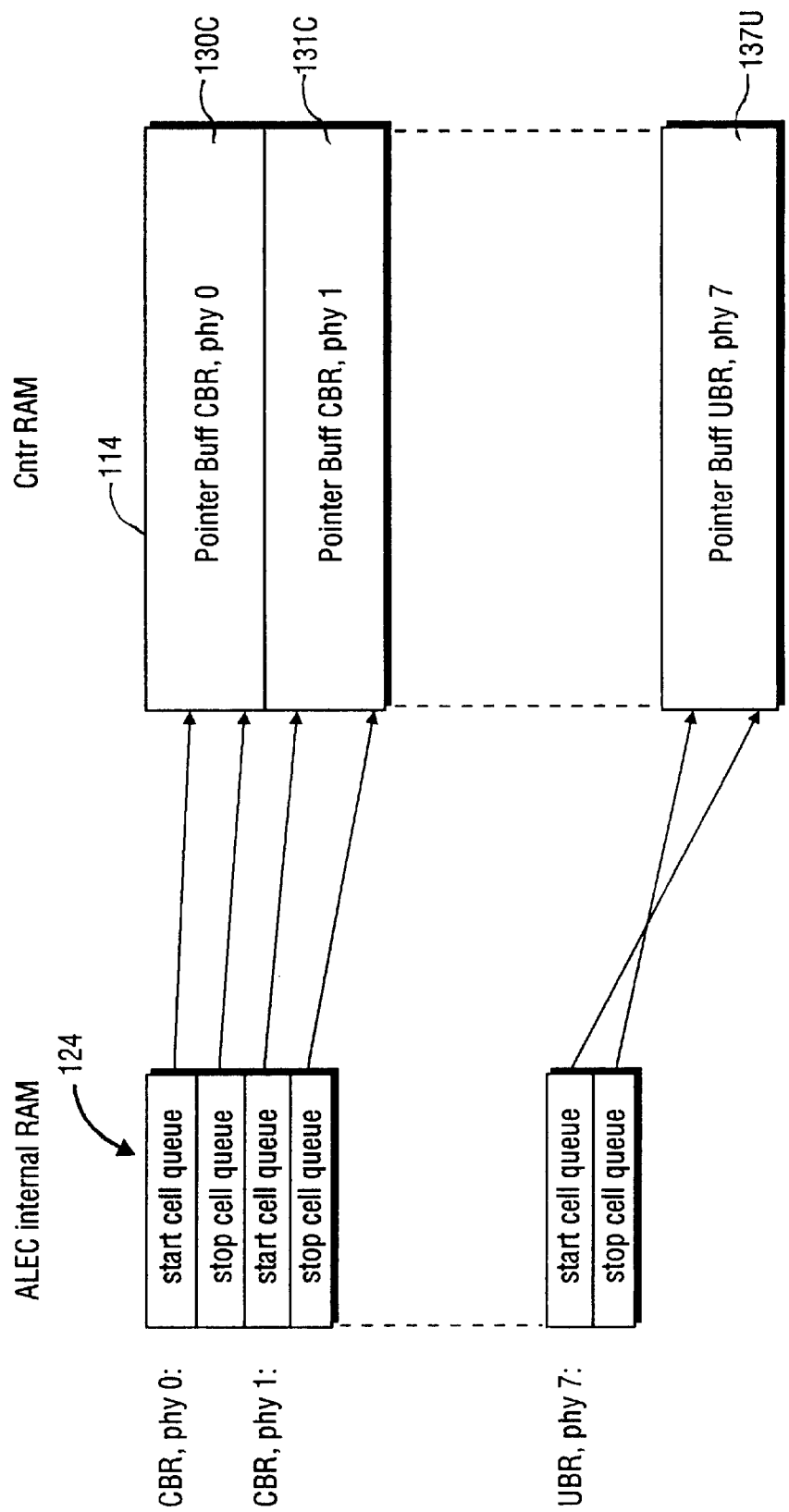
FIG. 13 is a diagrammatic view of a set of queue pointers in relationship to a set of queues.

As shown in FIG. 3 and FIG. 13, queue area 114 has many queues. In particular, queue area 114 has a plurality of queues for each of eight physical links ph0 to ph7. For example, for physical link ph0 there are queues 130C, 130r, 130n, 130A, and 130CR; for physical link ph1 there are queues 131C, 131r, 131n, 131A, and 131R; and so forth. For these queue reference numerals, the suffix "C" indicates that the queue is for CBR cells; the suffix "r" indicates that the queue is for rtVBR cells; the suffix "n" indicates that the queue is for nrtVBR cells; the suffix "A" indicates that the queue is for ABR cells; and, the suffix "U" indicates that the queue is for UBR cells.

Thus, step 516 involves determining which of the queues in queue area 114 is to be associated with the cell stored in cell buffer 92 at step 512. At step 516, a pointer is obtained from the set 124 of queue pointers to the next available location in such queue. The set 124 of queue pointers is shown in detail in FIG. 13, wherein it is seen that each queue in queue area 114 has both a start cell queue pointer and a stop cell queue pointer. At step 516, the stop cell queue pointer in set 124 for the appropriate queue (as determined at step 514) is incremented, and such incremented value utilized to point to the next available location in the queue. Then, at step 518, the address of the cell written at step 512 is written into the location determined at step 516. For example, if it were determined at step 516 that the cell is a CBR cell and to be associated with physical link phy0 (and thus queue 130C), the stop cell queue pointer for queue 130C in set 124 would be incremented and utilized to discern the next location in queue 130C to which the address in buffer 92 of the cell should be written.

If, at step 510, the value of MCI is determined to be one, the cell is a point-to-multipoint cell and step 532 is next executed. Step 532 involves writing the cell to the storage location in cell buffer 92 which was determined at step 508. As written into cell buffer 92, the point-to-multipoint cell has the structure shown in FIG. 9. In cell buffer 92 the point-to-multipoint cell includes the standard ATM cell fields, and in addition the ICI, PAA (Phy Pointer Active) [obtained from point-to-multipoint pointer connection data record], and next leaf pointer phy0–phy7 fields which are obtained from the corresponding fields Start pointer Phy0–Start pointer Phy7 of point-to-multipoint pointer connection data record (see FIG. 12 and step 502).

At step 534, the values in fields PPA and DP, having been obtained from the CDR (see FIG. 12), are utilized to determine to which physical link(s) 31–38 the cell will be outputted, and accordingly which of the queues in queue area 114 (see FIG. 3) will be utilized. In this regard, PPA has a bit corresponding to each of phy0–phy7, which bit is set active (i.e., equal to one) if a copy of the cell is to be sent out over the respective physical link 31–38.

At step 536, pointers are obtained from the set 124 of queue pointers (FIG. 13) to the next available location each of the queues corresponding to physical links to which the cell will be outputted. At step 536, the stop cell queue pointer in set 124 for each appropriate queue (as determined at step 534) is incremented, and such incremented value utilized to point to the next available location in the queue for the corresponding physical link. Then, at step 538, for each queue corresponding to a physical link to which the cell is to be translated, the address of the cell written at step 532 is written into the location determined at step 536.

Figure 6:
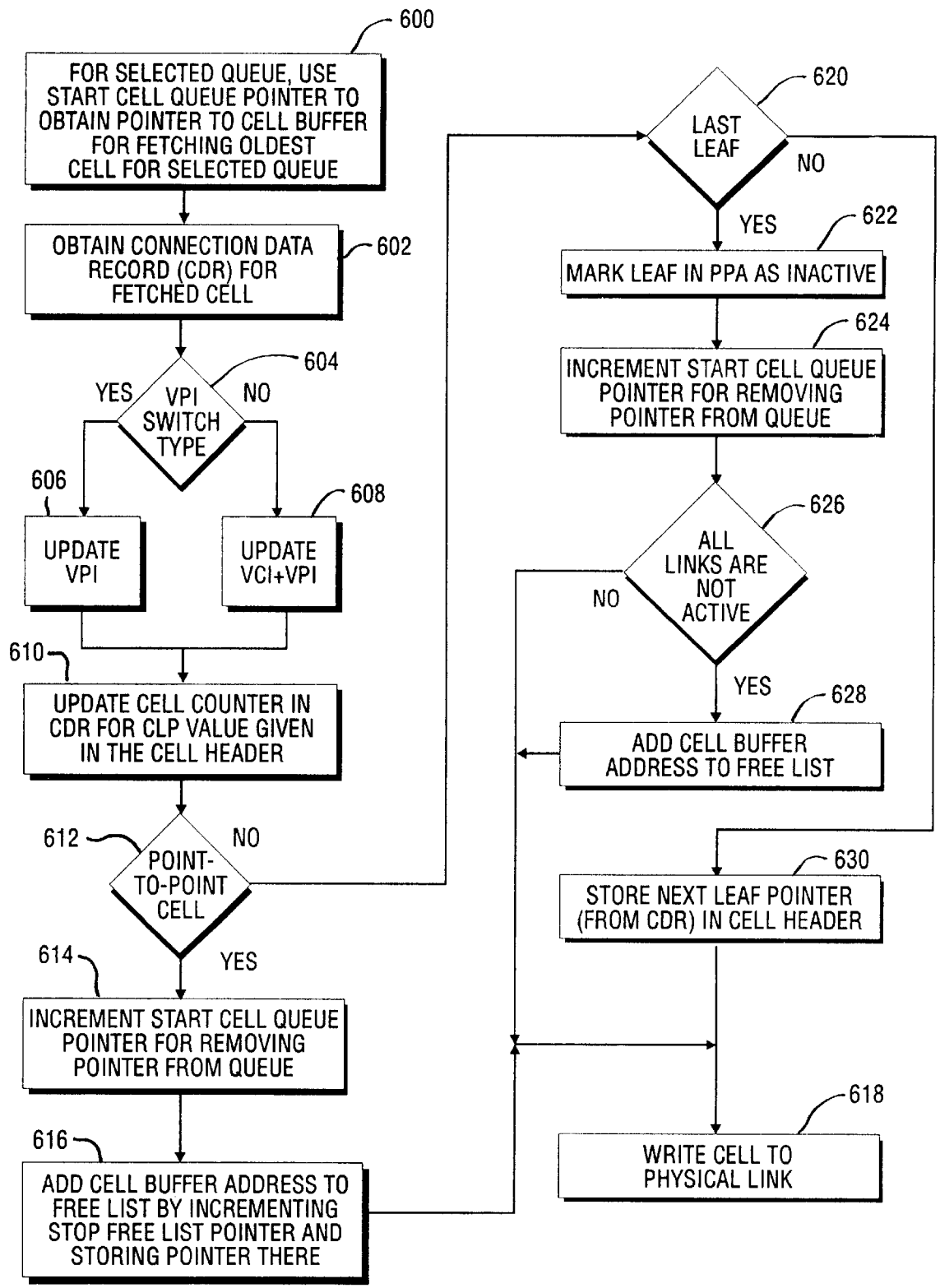
FIG. 6 is a flowchart showing basic steps involved in processing a cell obtained from a cell buffer memory and applied to a physical link.

FIG. 6 shows steps involved in reading out a cell from cell buffer 92 to a particular physical link. The queues in set 114 (see FIG. 3) each have pointers stored therein which point to cells in cell buffer 92. Preparatory to FIG. 6, a selector determines which of the physical links phy0–phy7 (i.e., links 31–38) is next to receive a cell. As indicated previously, one of the queues in set 114 corresponds to the selected physical link, and thus is the selected queue. For such selected queue, at step 600 the start cell queue pointer in set 124 (see FIG. 3 and FIG. 13) is utilized to obtain an oldest pointer from the corresponding queue in queue set 114. The pointer obtained from the queue in set 114 points to a cell in cell buffer 92. Thus, at step 600, the pointer obtained from the queue in set 114 is employed to fetch the oldest cell for the selected physical link.

At step 602, the connection data record (CDR) is obtained for the cell fetched at step 600. For a point-to-point cell, the CDR is obtained from area 110A of connection data record structure 110 (see FIG. 4) using the MCI and ICI fields of the cell header (see FIG. 8). As indicated previously, the MCI field indicates that the cell is point-to-point and thus that area 110A is to be accessed, and the ICI field serves as an index for obtaining the correct record in CDR area 110A. If the MCI field indicates that the cell is a point-to-multipoint cell, the value of the next leaf pointer for the selected physical output link (e.g., phy0 through phy7, see FIG. 9) is utilized to locate the CDR for the next leaf of the selected physical link.

In accordance with whether the switch type is VPI or VCI, either step 606 or step 608 is performed. For a VPI switch type, the VPI field is updated for both point-to-point and point-to-multipoint cells. For a VCI switch type, the VPI field is updated for a point-to-point cell and both VPI and VCI are updated for a point-to-multipoint cell.

Step 610 involves updating the cell counter in the CDR for the CLP (cell loss priority) value given in the cell header. The CDR record and cell counter CLPs for a point-to-point cell are shown in FIG. 10; the CDR record and cell counter CLPs for a point-to-multipoint cell are shown in FIG. 11.

At step 612 the value of the MCI field is again consulted to determine whether the cell is a point-to-point cell or a point-to-multipoint cell. For a point-to-point cell, steps 614, 616, and 618 are performed. For a point-to-multipoint cell, other steps shown in FIG. 6, culminating in step 618, are performed.

For a point-to-point cell, the address is first read and then the start cell queue pointer for the selected queue is incremented at step 614 (see FIG. 13). This incrementation serves to remove the pointer from the queue for the selected physical link. Then, at step 616, the address in cell buffer 92 for the cell-to-be-outputted is added to free list 112 (see FIG. 3). Step 616 is implemented by incrementing the stop free list pointer 122 (see FIG. 3) and storing the pointer to the address in cell buffer 92 for the cell-to-be-outputted at the location in the free list pointed to by the stop free list pointer 122. Lastly, the cell is outputted at step 618 by writing the cell to the selected physical link, e.g., one of links 31–38 (see FIG. 1).

For a point-to-multipoint cell, at step 620 a determination is made whether the leaf encountered is the last leaf. Specifically, step 620 involves checking the last leaf flag LL in the CDR record obtained at step 602. If the last leaf flag is set, steps 622, 624, 626, and possibly step 628 are executed prior to actually writing the cell to the selected physical link at step 618.

For a last leaf, at step 622 the leaf is marked as inactive in the PPA field. As explained earlier, the PPA field has a bit for each possible physical output link. When the last leaf has been processed for the selected physical output link, the bit for that selected link in the PPA field is changed from active to inactive (e.g., from a one to a zero). Then, at step 624, the pointer for the selected queue is removed from the queue by incrementing the start cell queue pointer for that queue (see FIG. 13).

In step 626, the PPA field is checked to determine whether all physical links have been marked as inactive, e.g., whether the PPA field has been changed to all zeros. If all physical links have been marked as inactive, at step 628 the cell buffer address is added to free list 112 (in like manner as described with respect to step 616) prior to executing step 618. Step 618 involves writing the cell to the selected physical link.

If the leaf currently processed does not have the last leaf flag LL set in its CDR, step 630 is executed prior to writing the cell to the selected physical link. At step 630, the value of the next leaf pointer field from the CDR (see FIG. 11) is stored in the field of the next leaf pointer for the selected physical link (e.g., Phy0 through Phy7) in the cell header (see FIG. 9). By virtue of step 630, the next time the same physical link is selected, the next leaf pointer in the cell header for the selected link will enable the fetching at step 602 for the proper CDR record for the next outgoing leaf on the selected link.

Figure 9:
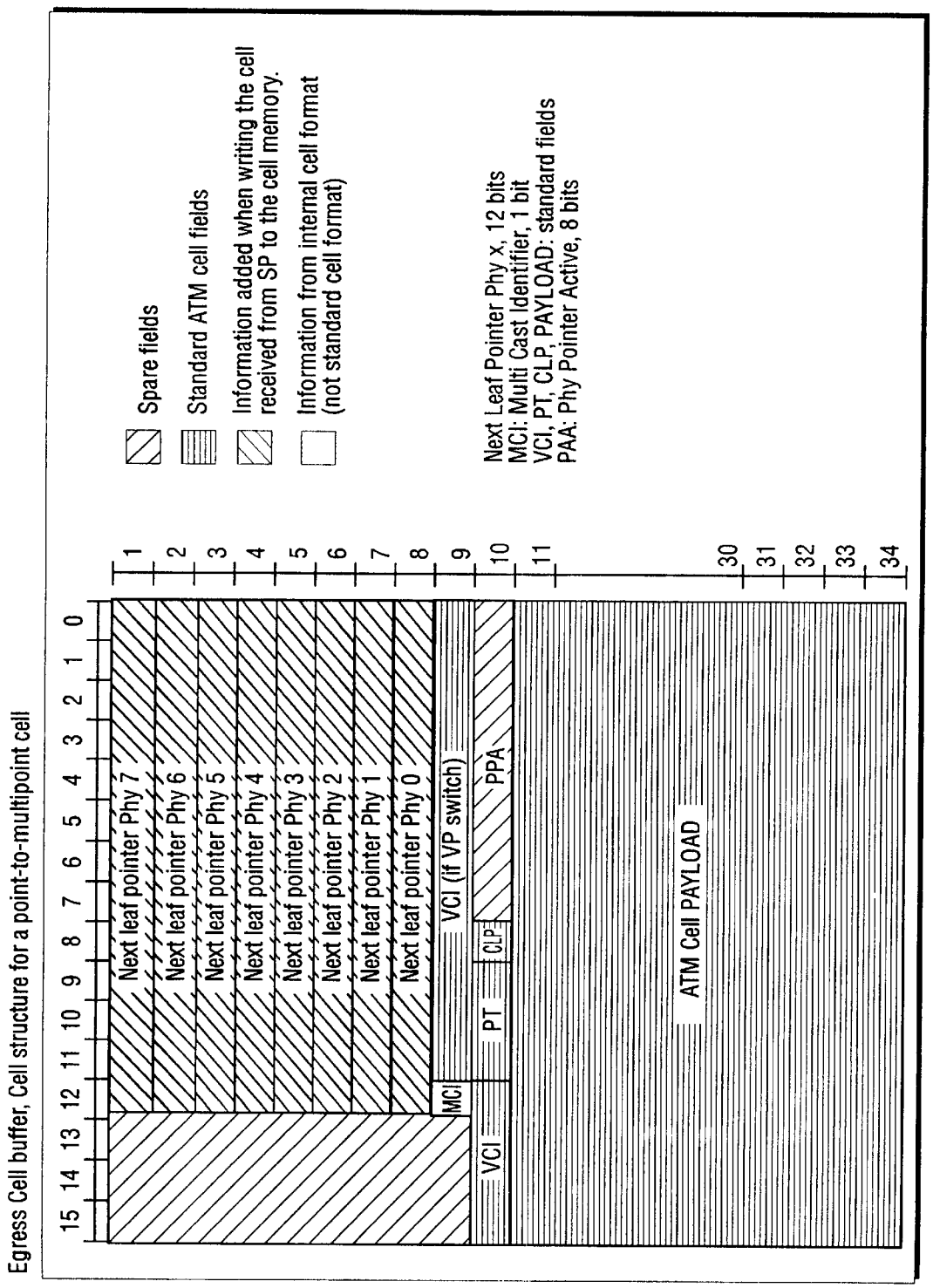
FIG. 9 is a diagrammatic view of a point-to-multipoint cell stored in a cell buffer memory of the ATM switch of FIG. 1.
Figure 16A:
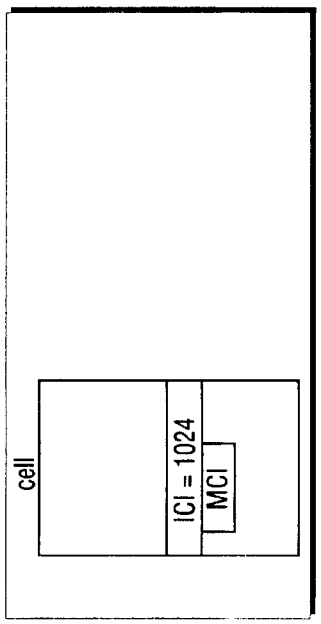
FIG. 16A–FIG. 16E are diagrammatic views showing selected contents of a cell buffer and memory of a buffer circuit in the course of handling an exemplary point-to-multipoint cell in accordance with a mode of the invention.
Figure 16B:
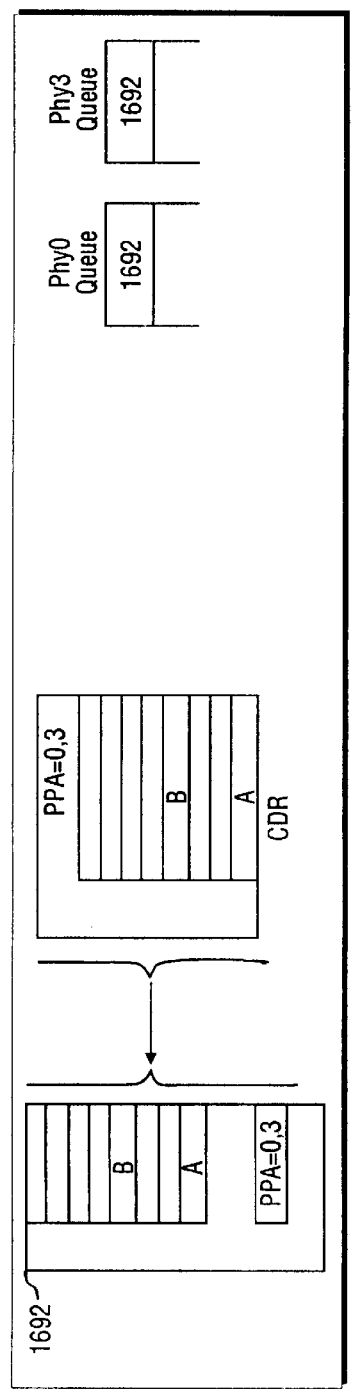

FIG. 16A–FIG. 16E and FIG. 17 are employed to illustrate exemplary handling of point-to-multipoint cells in accordance with the present invention. FIG. 16A shows the arrival of a cell containing ICI=1024 and an MCI=1 (indicative of point-to-multipoint) at buffer circuit 72 from switch core 22. In accordance with step 502, the values of MCI and ICI are utilized to obtain the connection data record (CDR) from area 110C of the connection data record structure 110 (see FIG. 4). The PPA and start pointers of the CDR record (shown in FIG. 12) are copied into the cell buffer along with the rest of the cell (FIG. 9). FIG. 16B shows the cell as being stored in cell buffer at an address 1692 in accordance with step 532. The particular determination of the address 1692 is the cell buffer is in accordance with steps 506 and 508 of FIG. 5.

In this example, the PPA field of the CDR indicates that only two physical links, particularly phy0 and phy3, are active. The next leaf pointer for Phy0 is the address A; the next leaf pointer for Phy3 is the address B. As mentioned, these addresses are loaded into the corresponding next leaf pointers in address 1692 of the cell buffer (see also FIG. 9 for the format of the cell buffer).

The queues for phy0 and phy3 are updated with a pointer to the address 1692 in the cell buffer. The process of updating the queues with pointers is understood from steps 534, 536, and 538 of FIG. 5.

Figure 16C:
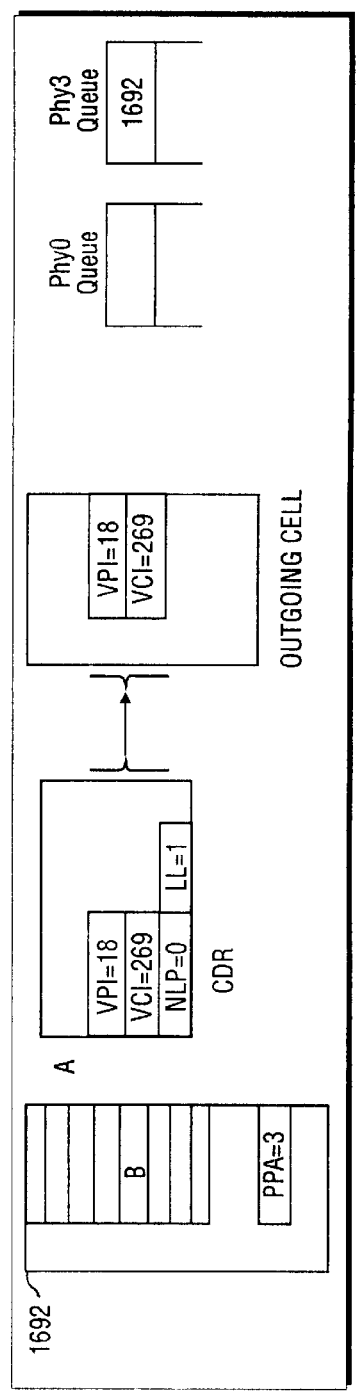

As the example continues, eventually the cell obtained in FIG. 16A and stored at address 1692 in cell buffer 92 becomes the oldest cell awaiting output on link phy0 and phy3. At this point, the example continues with the selector of buffer circuit 72 selecting the first physical link, i.e. phy0, and thereby invoking execution of the steps of FIG. 6 for a first time in this example. In accordance with step 602, the cell is read from address 1692 in cell buffer 92. Then, in accordance with step 602, the CDR record for the first leaf for link phy0, illustrated in FIG. 16C, is fetched from address A from the CDR area 110B. It will be recalled in connection with FIG. 16B that the address A was obtained from the next leaf pointer for phy0 in the cell header. The CDR obtained at step 602 for this first leaf of physical link phy0 has a VPI of 18 and a VCI of 269, which values are written into the outgoing cell as shown in FIG. 16C and in accordance with steps 606 and 608.

At step 620 it is determined from the last leaf flag LL of CDR record shown in FIG. 16C that the first leaf for physical link phy0 is the last leaf for physical link phy0. Therefore, in accordance with step 620 of FIG. 6, the first physical link phy0 is marked in the cell header at address 1692 as inactive (e.g., in FIG. 16C, PPA now has only the value three for phy3 in contrast to its former values of zero and three for phy0 and phy3, respectively). In accordance with step 624, the pointer to address 1692 is removed from the queue for phy0 prior to the cell being sent out on phy0.

Figure 16D:
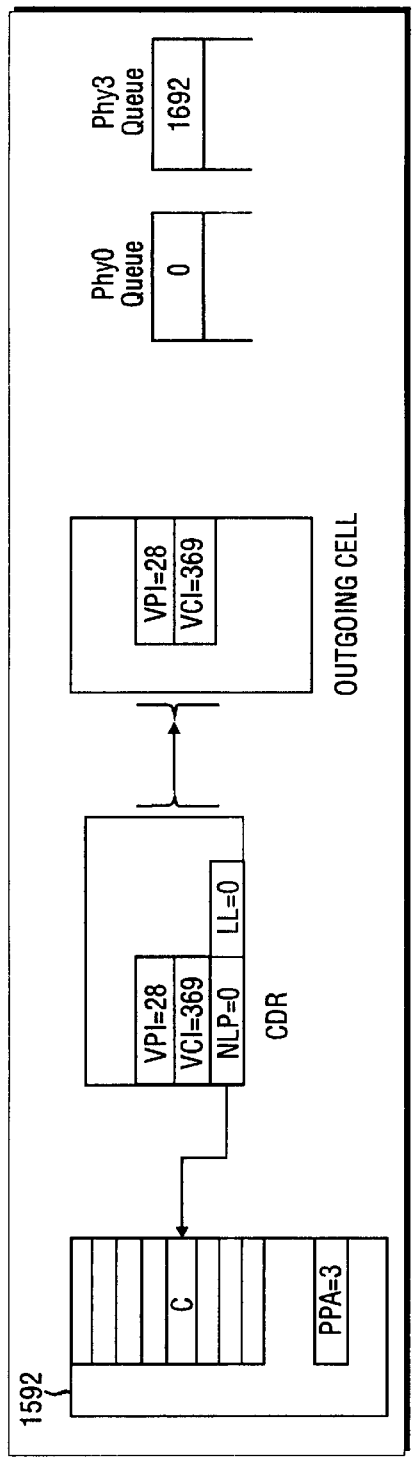

When the selector/scheduler of buffer circuit 72 selects phy3 as the next physical link, the example continues with a second pass of the steps of FIG. 6. Upon obtaining the cell from address 1692, the next leaf pointer for physical link phy3 is utilized at step 602 to locate the CDR record shown in FIG. 16D. The CDR obtained at step 602 for the first leaf of phy3 has a VPI have of 28 and a VCI value of 369, which values are stored in the outgoing cell in accordance with steps 606 and 608 and as shown in FIG. 16D. The check of the last leaf flag LL at step 620 shows the LL flag to have a zero content, meaning that physical link phy3 has other leaves corresponding to this cell. Such being the case, step 630 is executed for storing the next leaf pointer of the CDR into the cell header in address 1692. In particular, FIG. 16D shows that the next leaf pointer of the CDR has the address C, and the storage of address C into the next leaf pointer for phy3 in the cell header. At this point, the cell is written to physical link phy3 as the first leaf for physical link phy3.

Figure 16E:
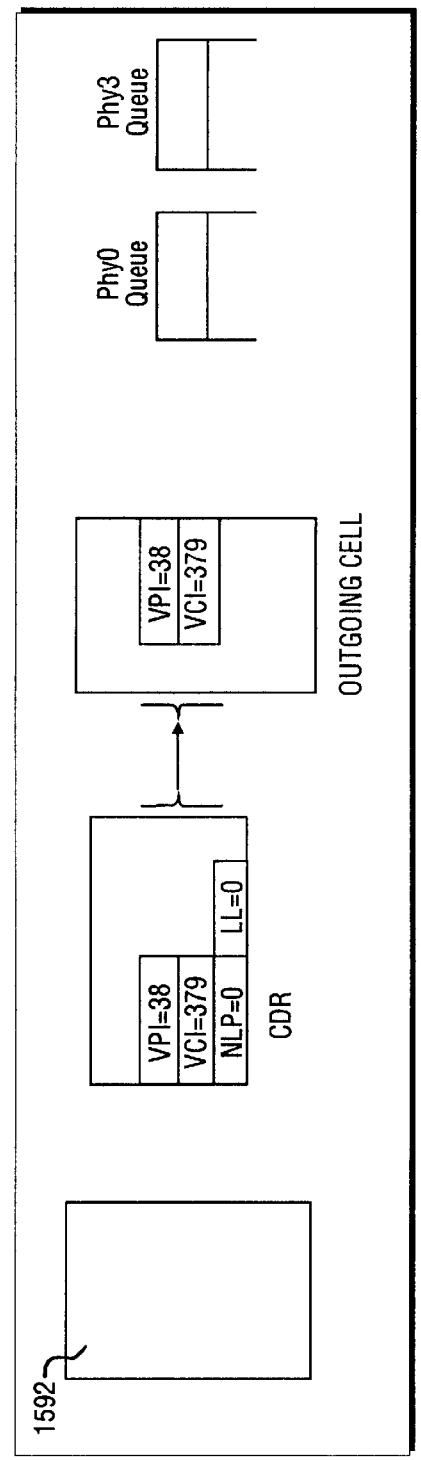
Figure 17:
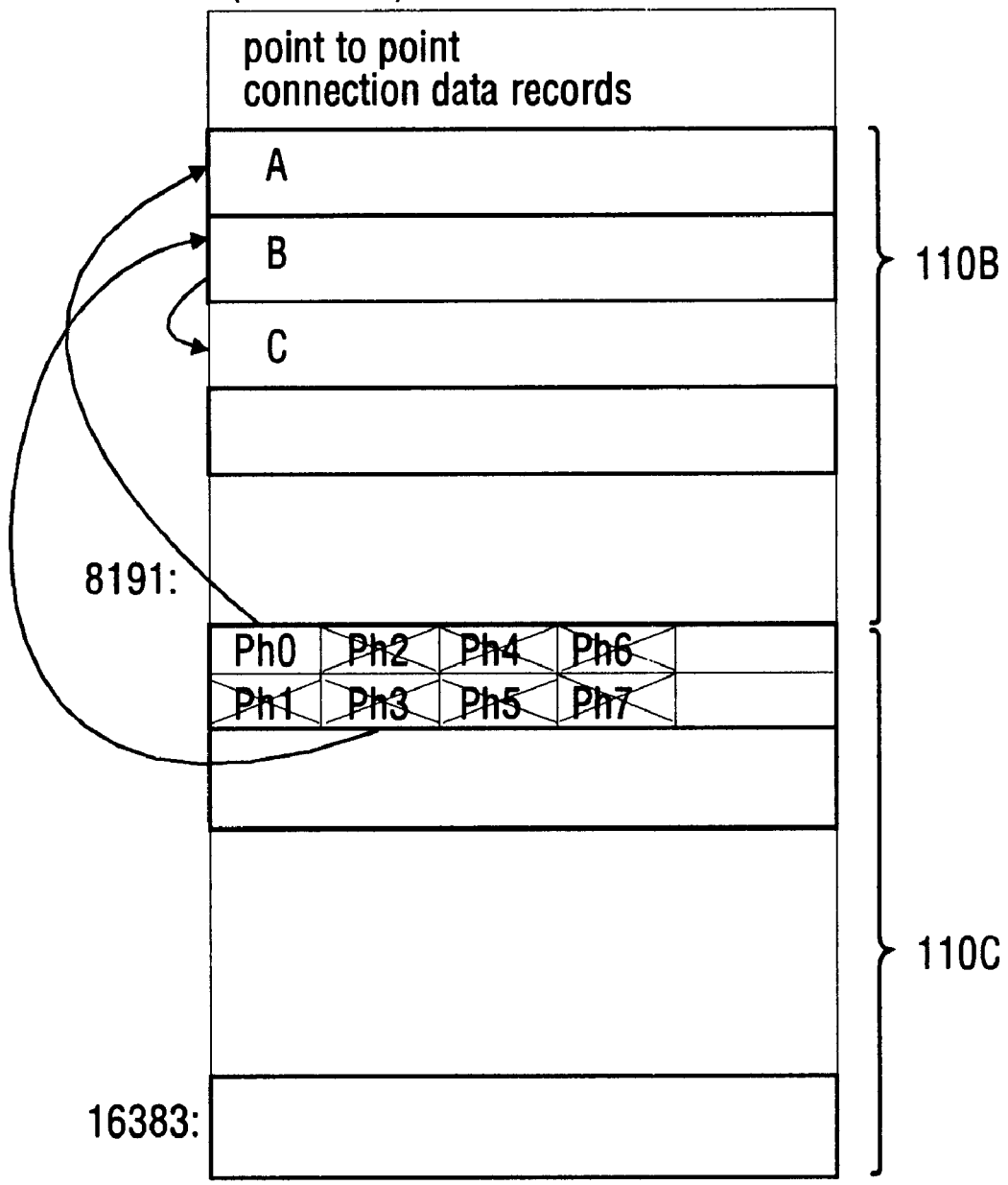
FIG. 17 is a diagrammatic view of a portion of the connection data record structure of FIG. 4, and further showing utilization of next leaf pointers.

When the selector/scheduler again selects physical link phy3, the next leaf pointer for physical link phy3 is read from the cell at address C in cell buffer 92. In link phy3, the next leaf pointer for physical link phy3 is read from the cell at address C in cell buffer 92. In particular, as shown in FIG. 16D, the next leaf pointer has the address C. The particular CDR fetched from address C is shown in FIG. 16E as including the VPI value 38 and the VCI value 379. In accordance with step 606 and 608, these new VPI and VCI values are written into the outgoing cell (see FIG. 16E). The check at step 620 indicates that the CDR at address C has its last leaf flag set (i.e., equal to one). Accordingly, as step 622 the PPA value is adjusted to mark phy3 as inactive and (as step 624) the pointer to address 1692 is removed from the queue for physical link phy3 (see FIG. 16E). Moreover, since all physical links are now marked inactive in the PPA for this cell, address 1692 of cell buffer 92 is placed in the free list 112 in accordance with step 628. Then, the second and last leaf of this cell for physical link phy3 is written to physical link phy3 (step 618).

The present invention thus saves memory space, since only a pointer and flag need to be added when copying a point-to-multipoint cell (as opposed to copying the entire cell). Moreover, the number of logical leaves will not be limited by the memory access time. Further, with the same memory access time, there can be more physical leaves than if the whole cell would be copied. There is no need to chose between point-to-point and point-to-multipoint queues to keep a right proportion. Still further, point-to-multipoint cells can be handled for all and same priority classes (there being no limit of priority classes for point-to-multipoint cells as compared to point-to-point cells).

While the invention has been particularly shown and described with reference to the preferred embodiments thereof, it will be understood by those skilled in the art that various alterations in form and detail may be made therein without departing from the spirit and scope of the invention. For example, it should readily be understood that the term switch ports can include such devices as trunk adapters.

What is claimed is:

1. An Asynchronous Transfer Mode (ATM) switching device through which ATM cells are routed to one or more of a plurality of physical output links, the switching device comprising:
  a plurality of pointer queues respectively corresponding to the plurality of physical output links;
  a cell memory wherein ATM cells destined are stored, the cell memory having stored therein ATM cells destined for output on differing ones of the physical output links;
  wherein pointers are stored in a selected pointer queue corresponding to a selected physical output link, the pointer serving to locate in the cell memory an output-destined ATM cell for the selected physical output link;
  a connection data record memory wherein is stored:
    a first connection data record for each cell, the first connection data record having stored therein a next leaf pointer for each of the physical output links which are active for the cell as well as an indicator of which physical output links are active for the cell; and
    a second connection data record which, for an active one of the physical output links, is pointed to by the next leaf pointer of the first connection data record for the respective physical output link, the second connection data record having stored therein a last leaf flag which indicates whether there is a further connection data record for the respective physical output link, the second connection data record having a further next leaf pointer stored therein in the case that the last leaf flag of the second connection data record indicates there is a further connection data record, the further next leaf pointer pointing to the further connection data record.

2. The apparatus of claim 1, wherein the second connection data record has at least one of a virtual path identifier (VPI) and a virtual circuit identifier (VCI) stored therein for inclusion in the output-destined ATM cell.

3. A method of handling Asynchronous Transfer Mode (ATM) in an ATM switching device through which ATM cells are routed to one or more of a plurality of physical output links, the method comprising:
  storing ATM cells destined for output to one or more of the plurality of physical output links in a common cell buffer;
  for each of the physical output links to which a specific cell is to be outputted, storing a pointer in a queue corresponding to the physical output links to which the specific cell is to be outputted, the pointer specifying a location of the specific cell in the common cell buffer;
  selecting a first physical output link included in the plurality of links as a selected physical output link to which the specific cell is to be outputted; for the first physical output link, obtaining the pointer from the queue corresponding to the first physical output link and using the pointer to obtain the ATM cell from the common cell buffer;
  obtaining a first connection data record for the specific cell, the first connection data record having stored therein a next leaf pointer for each of the physical output links which are active for the specific cell as well as an indicator of which physical output links are active for the specific cell; and
  obtaining a second connection data record which, for an active one of the physical output links, is pointed to by the next leaf pointer of the first connection data record for the respective physical output link, the second connection data record having stored therein a last leaf flag which indicates whether there is a further connection data record for the respective physical output link, the second connection data record further having a further next leaf pointer stored therein in the case that the last leaf flag of the second connection data record indicates there is a further connection data record, the further next leaf pointer pointing to the further connection data record.

4. The method of claim 3, further comprising obtaining from the second connection data record at least one of a virtual path identifier (VPI) and a virtual circuit identifier (VCI) stored therein for inclusion in the output-destined ATM cell.

5. An Asynchronous Transfer Mode (ATM) switching device through which ATM cells are routed to plural physical output links including a selected pysical output link, the switching device comprising:
  a cell buffer in which the multicast cell is stored in a cell location;
  a connection data record memory which has stored therein connection data information for the multicast cell for indicating to which of the plural physical output links the multicast cell is to be readout;
  a readout queue for the selected output link;
  wherein, when plural leafs for the cell location in the buffer are to be readout on the selected output link, the readout queue is kept pointing to the cell location in the buffer for the multicast cell until the multicast cell is readout on the selected output link for each of the plural leafs.

6. The apparatus of claim 5, wherein the connection data record memory has stored therein a first connection data record for the multicast cell and a second connection data record for the multicast cell, the first connection data record including a next leaf pointer field (NLF) for the selected output link, the second connection data including VPI/VCI information.

7. The apparatus of claim 6, further comprising a buffer circuit which:
  (1) obtains the first connection data record for the multicast cell and uses contents of the next leaf pointer field to fetch the second connection data record for the multicast cell;
  (2) enters a pointer in the readout queue, the pointer pointing to the cell location in the buffer; and
  (3) when the selected output link is selected for readout:
    (a) accesses the readout queue to obtain the cell location, and then reads out the cell to the selected output link, including in the cell as read out the VPI/VCI information obtained from the second connection data record;
    (b) if there is not a next leaf pointer in the second connection data record for the selected output link; removing the pointer to the cell location from the readout queue; and
    (c) if there is a next leaf pointer in the second connection data record for the at least one output link; uses contents of the next leaf pointer field of the second connection data record to readout the cell for another leaf.

8. A method of handling Asynchronous Transfer Mode (ATM) in an ATM switching device through which ATM cells are routed to plural physical output links including a selected output link, the method comprising:

(1) storing a multicast cell in a cell location in a buffer;

(2) obtaining connection data information for the multicast cell for indicating to which of the plural physical output links the multicast cell is to be readout;

(3) entering a pointer in a readout queue for the at least one output link, the pointer pointing to the cell location in the buffer; and (4) when plural leafs for the cell location in the buffer are to be readout on the selected output link, maintaining the pointer in the readout queue pointing to the cell location in the buffer for the multicast cell until the multicast cell is readout on the selected output link for each of plural leafs.

9. The method of claim 8, wherein the step of obtaining connection data information further comprises obtaining from the a first connection data record a next leaf pointer field for the selected output link.

10. The method of claim 9, further comprising, when the selected output link is selected for readout, the steps of:

(a) fetching a second connection data record using the contents of the next leaf pointer field, the second connection data record including VPI/VCI information;

(b) accessing the readout queue to obtain the cell location, and then reading out the cell to the selected output link to include in the cell as read out the VPI/VCI information obtained from the second connection data record;

(c) checking the second connection data record to determine whether there is a next leaf pointer for the at least one output link;

(d) if the check of step (c) is negative, removing the pointer of step (3) from the readout queue; and (e) if the check of step (c) is positive, using contents of the next leaf pointer field of the second connection data record as the contents of the next leaf pointer field when the selected output link is selected for readout for a repetition of steps (a)–(e).

11. The method of claim 9, wherein the first connection data record includes a next leaf pointer field for each of plural output links; and wherein steps (3)–(4) are performed for each of plural output links in addition to the selected output link.

12. The method of claim 9, further comprising copying contents of the next leaf pointer field into the cell location in the buffer.

13. The method of claim 8, wherein step (2) comprises using an internal channel identifier included in the multicast cell to obtain the first connection data record.

* * * * *

UNITED STATES PATENT AND TRADEMARK OFFICE
CERTIFICATE OF CORRECTION

PATENT NO. : 6,128,295
DATED : October 3, 2000
INVENTOR(S) : Larsson et al.

It is certified that error appears in the above-identified patent and that said Letters Patent is hereby corrected as shown below:

<u>Title page,</u>
Please correct the following:
-- [73], Assignee: Telefonaktiebolaget LM Ericsson
Stockholm, Sweden --

Signed and Sealed this

Fifth Day of February, 2002

*Attest:*

*Attesting Officer*

JAMES E. ROGAN
*Director of the United States Patent and Trademark Office*